United States Patent
Gallagher et al.

(10) Patent No.: US 12,432,444 B2
(45) Date of Patent: Sep. 30, 2025

(54) POWER MANAGEMENT TECHNIQUES IN DEPTH IMAGING

(71) Applicant: AIRY3D INC., Montréal (CA)

(72) Inventors: Paul Gallagher, San Jose, CA (US); Imrul Kayes, Montreal (CA); Siamak Abdollahi, Montreal (CA); Simon Summy, Montreal (CA)

(73) Assignee: AIRY3D INC., Montréal (CA)

( * ) Notice: Subject to any disclaimer, the term of this patent is extended or adjusted under 35 U.S.C. 154(b) by 274 days.

(21) Appl. No.: 18/262,466

(22) PCT Filed: Jan. 21, 2022

(86) PCT No.: PCT/CA2022/050087
§ 371 (c)(1),
(2) Date: Jul. 21, 2023

(87) PCT Pub. No.: WO2022/155747
PCT Pub. Date: Jul. 28, 2022

(65) Prior Publication Data
US 2024/0114235 A1      Apr. 4, 2024

Related U.S. Application Data

(60) Provisional application No. 63/140,583, filed on Jan. 22, 2021.

(51) Int. Cl.
*H04N 23/65* (2023.01)
*H04N 23/20* (2023.01)
*H04N 23/56* (2023.01)

(52) U.S. Cl.
CPC ........... *H04N 23/651* (2023.01); *H04N 23/20* (2023.01); *H04N 23/56* (2023.01)

(58) Field of Classification Search
CPC ...... H04N 23/651; H04N 23/20; H04N 23/56; H04N 25/11; H04N 23/957;
(Continued)

(56) References Cited

U.S. PATENT DOCUMENTS

| | | |
|---|---|---|
| 2014/0168369 A1 | 6/2014 | Crane et al. |
| 2015/0161798 A1 | 6/2015 | Venkataraman et al. |

(Continued)

FOREIGN PATENT DOCUMENTS

| | | |
|---|---|---|
| WO | 2017210781 A1 | 12/2017 |
| WO | 2019109182 A1 | 6/2019 |
| WO | 2020243828 A1 | 12/2020 |

OTHER PUBLICATIONS

Canadian Intellectual Property Office, International Search Report issued to PCT/CA/2022/050087 dated May 7, 2022, 6 pages.
(Continued)

*Primary Examiner* — Lin Ye
*Assistant Examiner* — Tuan H Le
(74) *Attorney, Agent, or Firm* — KDW FIRM PLLC

(57) ABSTRACT

A method of managing power usage of a depth imaging system including an image sensor having an array of pixels configured to detect light incident from a scene and an optical encoder configured to modulate the incident light detected by the pixels in accordance with an angle of incidence of the incident light. The method includes operating the system in a lower power mode corresponding to a first power consumption level, including capturing, with the pixels, image data of the scene having angle-dependent information encoded therein by the optical encoder, and identifying, based on the angle-dependent information, signature information in the image data indicative of a detection of an object within a specified depth range. The method also includes, in response to identifying the signature information, transitioning to operating the system in a higher power mode corresponding to a second power consumption level higher than the first power consumption level.

22 Claims, 11 Drawing Sheets

(58) Field of Classification Search
CPC .......................... G02B 27/4211; G02B 5/1842; G02B 5/1871; G02B 5/1866; G02B 27/4205; G02B 27/0075
See application file for complete search history.

(56) References Cited

U.S. PATENT DOCUMENTS

| | | | |
|---|---|---|---|
| 2016/0342836 A1* | 11/2016 | Hanna | G06T 7/50 |
| 2017/0135617 A1* | 5/2017 | Alasirniö | G01S 17/48 |
| 2017/0184704 A1 | 6/2017 | Yang et al. | |
| 2017/0272651 A1 | 9/2017 | Mathy et al. | |
| 2020/0193640 A1 | 6/2020 | Mathy et al. | |
| 2020/0359004 A1* | 11/2020 | Saari | H04N 13/207 |
| 2022/0129066 A1* | 4/2022 | Zahnert | G06T 7/75 |
| 2024/0053480 A1* | 2/2024 | Blasch | G01S 17/86 |

OTHER PUBLICATIONS

Kunnath, N., "Depth from Defocus using Angle Sensitive Pixels based on a Transmissive Diffraction Mask" (Master's thesis, McGill University Libraries, 2018) https://escholarship.mcgill.ca/concern/theses/5t34sm788.

* cited by examiner

POWER MANAGEMENT TECHNIQUES IN DEPTH IMAGING

CROSS REFERENCE TO RELATED PATENT APPLICATIONS

The present application is a national stage application under 35 U.S.C. § 371 of International Application No. PCT/CA2022/050087, filed Jan. 21, 2022, which claims priority to U.S. Provisional Patent Application No. 63/140,583 filed on Jan. 22, 2021, the disclosure of which is. The above-referenced patent applications are incorporated herein by reference in their entirety.

TECHNICAL FIELD

The technical field generally relates to imaging technology, and more particularly, to depth imaging.

BACKGROUND

Traditional imaging techniques involve the projection of three-dimensional (3D) scenes onto two-dimensional (2D) planes, resulting in a loss of information, including a loss of depth information. This loss of information is a result of the nature of square-law detectors, such as charge-coupled devices (CCD) and complementary metal-oxide-semiconductor (CMOS) sensor arrays, which can only directly measure the time-averaged intensity of incident light. A variety of imaging techniques, both active and passive, have been developed that can provide 3D image information, including depth information. Non-limiting examples of 3D imaging techniques include, to name a few, stereoscopic and multiscopic imaging, time of flight, structured light, plenoptic and light field imaging, diffraction-grating-based imaging, and depth from focus or defocus. While each of these imaging techniques has certain advantages, each also has some drawbacks and limitations. Challenges therefore remain in the field of 3D imaging.

SUMMARY

The present description generally relates to power and energy management techniques for use in depth imaging.

In accordance with an aspect, there is provided a method of managing power usage of a depth imaging system, the depth imaging system including an image sensor having an array of pixels configured to detect light incident from a scene, and an angle-sensitive optical encoder interposed between the image sensor and the scene and configured to modulate the incident light detected by the array of pixels in accordance with an angle of incidence of the incident light, the method including:

operating the depth imaging system in a lower power mode corresponding to a first power consumption level of the depth imaging system, the operating including:
capturing, with the array of pixels, image data of the scene, the image data having angle-dependent information encoded therein by the angle-sensitive optical encoder; and
identifying, with a processor and based on the angle-dependent information, signature information in the captured image data indicative of a detection of an object within a specified depth range of the scene; and
in response to identifying the signature information, transitioning the depth imaging system from operating in the lower power mode to operating in a higher power mode corresponding to a second power consumption level of the depth imaging system, wherein the first power consumption level is lower than the second power consumption level.

In some embodiments, the depth imaging system is configured to draw power from an internal battery.

In some embodiments, the depth imaging system is configured to operate at a first pixel throughput rate in the lower power mode; the depth imaging system is configured to operate at a second pixel throughput rate in the higher power mode; and the first pixel throughput rate is lower than the second pixel throughput rate. In some embodiments, the first pixel throughput rate corresponds to the product of a first frame rate and a first number of enabled pixels of the array of pixels for capturing the image data of the scene in the lower power mode; the second pixel throughput rate corresponds to the product of a second frame rate and a second number of enabled pixels of the array of pixels for capturing the image data of the scene in the higher power mode; and the first frame rate is lower than the second frame rate and/or the first number of enabled pixels is less than the second number of enabled pixels. In some embodiments, a ratio of the second number of enabled pixels to the first number of enabled pixels ranges from 2 to 1000. In some embodiments, a ratio of the second frame rate to the first frame rate is greater than one and less than 100.

In some embodiments, the depth imaging system further includes an infrared illumination source configured to illuminate the scene with infrared illumination light, wherein the infrared illumination source is configured to consume less power in the lower power mode than in the higher power mode; the array of pixels includes infrared-sensitive pixels configured to capture infrared image data as at least part of the image data; and identifying the signature information in the captured image data is performed based at least in part on the infrared image data. In some embodiments, the infrared illumination source is configured to be inactive in the lower power mode. In some embodiments, the infrared illumination source is configured to be active in the lower power mode.

In some embodiments, the signature information consists solely of a presence of the object within the specified depth range. In some embodiments, the signature information includes a presence of the object within the specified depth range and at least one additional characteristic of the object. In some embodiments, the at least one additional characteristic of the object includes a type of the object, a size of the object, a shape of the object, a motion of the object, a position of the object within the specified depth range, an orientation of the object, an optical property of the object, or any combination thereof. In some embodiments, identifying the at least one additional characteristic of the object is performed based at least in part on the angle-dependent information.

In some embodiments, the method further includes determining whether an end condition to stop operating the depth imaging system in the higher power mode has been reached; if the end condition has been reached, returning the depth imaging system to operating in the lower power mode; and if the end condition has not been reached, continuing operating the depth imaging system in the higher power mode. In some embodiments, determining whether the end condition has been reached includes assessing whether a specified number of images have been captured by the depth image system in the higher power mode; or assessing whether a specified time period has elapsed; or assessing whether the object is no longer in the specified depth range; or assessing whether a specified information about the object has been determined by imaging the object in the higher power mode; or any combination thereof.

In some embodiments, the method further includes setting or adjusting the first power consumption level of the lower power mode based on operating conditions of the depth imaging system. In some embodiments, the operating conditions include a battery charge state associated with the depth imaging system; or one or more environmental conditions associated with the scene; or an intended use case associated with the operation of the depth imaging system; or any combination thereof. In some embodiments, the one or more environmental conditions include lighting conditions or temperature conditions.

In some embodiments, the object includes an animate object. In some embodiments, the object includes an inanimate object.

In some embodiments, the method further includes setting or adjusting the second power consumption level of the higher power mode based on a position and/or a velocity of the object within the specified depth range. In some embodiments, setting or adjusting the second power consumption level includes increasing the second power consumption level as the object gets closer to a reference position within scene.

In some embodiments, the method further includes generating an alert in response to identifying the signature information. In some embodiments, the alert includes a request or a recommendation to perform one or more actions.

In some embodiments, capturing the image data includes capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder. In some embodiments, the pixel responses of the first set have magnitudes that increase as the angle of incidence increases, and wherein the pixel responses of the second set have magnitudes that decrease as the angle of incidence increases. In some embodiments, identifying the signature information in the captured image data includes: computing a plurality of summed pixel responses based on a sum operation between the first set of pixel responses and the second set of pixel responses; computing a plurality of differential pixel responses based on a difference operation between the first set of pixel responses and the second set of pixel responses; and determining the angle-dependent information based on the plurality of summed pixel responses and the plurality of differential pixel responses.

In some embodiments, the angle-sensitive optical encoder includes a transmissive diffraction mask (TDM), the TDM being configured to diffract the incident light prior to the incident light reaching the array of pixels, the diffracted light having the angle-dependent information encoded therein for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the angle-sensitive optical encoder includes an array of microlenses. In some embodiments, each microlens covers two pixels of the image sensor. In some embodiments, each microlens covers four pixels of the image sensor, the four pixels being arranged in a 2×2 cell.

In some embodiments, the image sensor includes a color filter array interposed between the angle-sensitive optical encoder and the array of pixels.

In accordance with another aspect, there is provided a non-transitory computer readable storage medium having stored thereon computer readable instructions that, when executed by a processor, cause the processor to perform a method of managing power usage of a depth imaging system, the depth imaging system including an image sensor having an array of pixels configured to detect light incident from a scene, and an angle-sensitive optical encoder interposed between the image sensor and the scene and configured to modulate the incident light detected by the array of pixels in accordance with an angle of incidence of the incident light, the method including:
  controlling the depth imaging system to operate in a lower power mode corresponding to a first power consumption level of the depth imaging system and capture, in the lower power mode and with the array of pixels, image data of the scene, the image data having angle-dependent information encoded therein by the angle-sensitive optical encoder;
  receiving, from the image sensor, the image data captured with the array of pixels;
  identifying, based on the angle-dependent information, signature information in the captured image data indicative of a detection of an object within a specified depth range of the scene; and
  in response to identifying the signature information, controlling the depth imaging system to transition from operating in the lower power mode to operating in a higher power mode corresponding to a second power consumption level of the depth imaging system, wherein the first power consumption level is lower than the second power consumption level.

In some embodiments, the depth imaging system is configured to operate at a first pixel throughput rate in the lower power mode; the depth imaging system is configured to operate at a second pixel throughput rate in the higher power mode; and the first pixel throughput rate is lower than the second pixel throughput rate. In some embodiments, the first pixel throughput rate corresponds to the product of a first frame rate and a first number of enabled pixels of the array of pixels for capturing the image data of the scene in the lower power mode; the second pixel throughput rate corresponds to the product of a second frame rate and a second number of enabled pixels of the array of pixels for capturing the image data of the scene in the higher power mode; and the first frame rate is lower than the second frame rate and/or the first number of enabled pixels is less than the second number of enabled pixels.

In some embodiments, the depth imaging system further includes an infrared illumination source configured to illuminate the scene with infrared illumination light, wherein the infrared illumination source is configured to consume less power in the lower power mode than in the higher power mode; the array of pixels includes infrared-sensitive pixels configured to capture infrared image data as at least part of the image data; and identifying the signature information in the captured image data is performed based at least in part on the infrared image data.

In some embodiments, wherein the signature information consists solely of a presence of the object within the specified depth range. In some embodiments, the signature information includes a presence of the object within the specified depth range and at least one additional characteristic of the object. In some embodiments, the at least one additional characteristic of the object includes a type of the object, a size of the object, a shape of the object, a motion of the object, a position of the object within the specified depth range, an orientation of the object, an optical property of the object, or any combination thereof.

In some embodiments, the method further includes determining whether an end condition to stop operating the depth imaging system in the higher power mode has been reached; if the end condition has been reached, returning the depth imaging system to operating in the lower power mode; and if the end condition has not been reached, continuing operating the depth imaging system in the higher power mode.

In some embodiments, the method further includes setting or adjusting the first power consumption level of the lower power mode based on operating conditions of the depth imaging system. In some embodiments, the operating conditions include a battery charge state associated with the depth imaging system; or one or more environmental conditions associated with the scene; or an intended use case associated with the operation of the depth imaging system; or any combination thereof.

In some embodiments, the method further includes setting or adjusting the second power consumption level of the higher power mode based on a position and/or a velocity of the object within the specified depth range.

In some embodiments, capturing the image data includes capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder. In some embodiments, identifying the signature information in the captured image data includes: computing a plurality of summed pixel responses based on a sum operation between the first set of pixel responses and the second set of pixel responses; computing a plurality of differential pixel responses based on a difference operation between the first set of pixel responses and the second set of pixel responses; and determining the angle-dependent information based on the plurality of summed pixel responses and the plurality of differential pixel responses.

In some embodiments, the angle-sensitive optical encoder includes a transmissive diffraction mask (TDM), the TDM being configured to diffract the incident light prior to the incident light reaching the array of pixels, the diffracted light having the angle-dependent information encoded therein for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the angle-sensitive optical encoder includes an array of microlenses. In some embodiments, each microlens covers two pixels of the image sensor. In some embodiments, each microlens covers four pixels of the image sensor, the four pixels being arranged in a 2×2 cell.

In accordance with another aspect, there is provided a computer device including a processor and a non-transitory computer readable storage medium as described herein, the non-transitory computer readable storage medium being operatively coupled to the processor.

In accordance with another aspect, there is provided a depth imaging system having power usage management capabilities, the depth imaging system including:
  an image sensor having an array of pixels configured to detect light incident from a scene;
  an angle-sensitive optical encoder interposed between the image sensor and the scene and configured to modulate the incident light detected by the array of pixels in accordance with an angle of incidence of the incident light; and
  a computer device including a processor and a non-transitory computer readable storage medium having stored thereon computer readable instructions that, when executed by the processor, cause the processor to perform operations, the operations including:
    controlling the depth imaging system to operate in a lower power mode corresponding to a first power consumption level of the depth imaging system and capture, in the lower power mode and with the array of pixels, image data of the scene, the image data having angle-dependent information encoded therein by the angle-sensitive optical encoder;
    receiving, from the image sensor, the image data captured with the array of pixels; and
    identifying, based on the angle-dependent information, signature information in the captured image data indicative of a detection of an object within a specified depth range of the scene;
    and in response to identifying the signature information, controlling the depth imaging system to transition from operating in the lower power mode to operating in a higher power mode corresponding to a second power consumption level of the depth imaging system, wherein the first power consumption level is lower than the second power consumption level.

In some embodiments, the depth imaging system further includes an internal battery, and wherein the image sensor and the computer device are configured to draw power from the internal battery.

In some embodiments, the depth imaging system is configured to operate at a first pixel throughput rate in the lower power mode; the depth imaging system is configured to operate at a second pixel throughput rate in the higher power mode; and the first pixel throughput rate is lower than the second pixel throughput rate. In some embodiments, the first pixel throughput rate corresponds to the product of a first frame rate and a first number of enabled pixels of the array of pixels for capturing the image data of the scene in the lower power mode; the second pixel throughput rate corresponds to the product of a second frame rate and a second number of enabled pixels of the array of pixels for capturing the image data of the scene in the higher power mode; and the first frame rate is lower than the second frame rate and/or the first number of enabled pixels is less than the second number of enabled pixels.

In some embodiments, the depth imaging system further includes an infrared illumination source configured to illuminate the scene with infrared illumination light, wherein the infrared illumination source is configured to consume less power in the lower power mode than in the higher power mode; the array of pixels includes infrared-sensitive pixels configured to capture infrared image data as at least part of the image data; and identifying the signature information in the captured image data is performed based at least in part on the infrared image data. In some embodiments, the infrared illumination source is configured to be inactive in the lower power mode. In some embodiments, the infrared illumination source is configured to be active in the lower power mode.

In some embodiments, the signature information consists solely of a presence of the object within the specified depth range. In some embodiments, the signature information includes a presence of the object within the specified depth range and at least one additional characteristic of the object. In some embodiments, the at least one additional characteristic of the object includes a type of the object, a size of the object, a shape of the object, a motion of the object, a position of the object within the specified depth range, an orientation of the object, an optical property of the object, or any combination thereof.

In some embodiments, the operations further include setting or adjusting the first power consumption level of the lower power mode based on operating conditions of the depth imaging system. In some embodiments, the operating conditions include a battery charge state associated with the depth imaging system; or one or more environmental conditions associated with the scene; or an intended use case associated with the operation of the depth imaging system; or any combination thereof.

In some embodiments, the operations further include setting or adjusting the second power consumption level of the higher power mode based on a position and/or a velocity of the object within the specified depth range. In some embodiments, setting or adjusting the second power consumption level includes increasing the second power consumption level as the object gets closer to a reference position within scene.

In some embodiments, capturing the image data includes capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder. In some embodiments, the pixel responses of the first set have magnitudes that increase as the angle of incidence increases, and wherein the pixel responses of the second set have magnitudes that decrease as the angle of incidence increases. In some embodiments, identifying the signature information in the captured image data includes: computing a plurality of summed pixel responses based on a sum operation between the first set of pixel responses and the second set of pixel responses; computing a plurality of differential pixel responses based on a difference operation between the first set of pixel responses and the second set of pixel responses; and determining the angle-dependent information based on the plurality of summed pixel responses and the plurality of differential pixel responses.

In some embodiments, the angle-sensitive optical encoder includes a transmissive diffraction mask (TDM), the TDM being configured to diffract the incident light prior to the incident light reaching the array of pixels, the diffracted light having the angle-dependent information encoded therein for detection by the image sensor as the captured image data. In some embodiments, the TDM includes a binary phase grating including a series of alternating ridges and grooves extending along a grating axis at a grating period. In some embodiments, the image sensor has a pixel pitch along the grating axis, the pixel pitch being half of the grating period.

In some embodiments, the angle-sensitive optical encoder includes an array of microlenses. In some embodiments, each microlens covers two pixels of the image sensor. In some embodiments, each microlens covers four pixels of the image sensor, the four pixels being arranged in a 2×2 cell.

In some embodiments, the image sensor includes a color filter array interposed between the angle-sensitive optical encoder and the array of pixels.

Other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 4 also depicts curves of the sum $I_{sum}=I_++I_-$ and the difference $I_{diff}=I_+-I_-$ of the odd and even pixel responses as functions of $\theta$.

DETAILED DESCRIPTION

Figure 1:
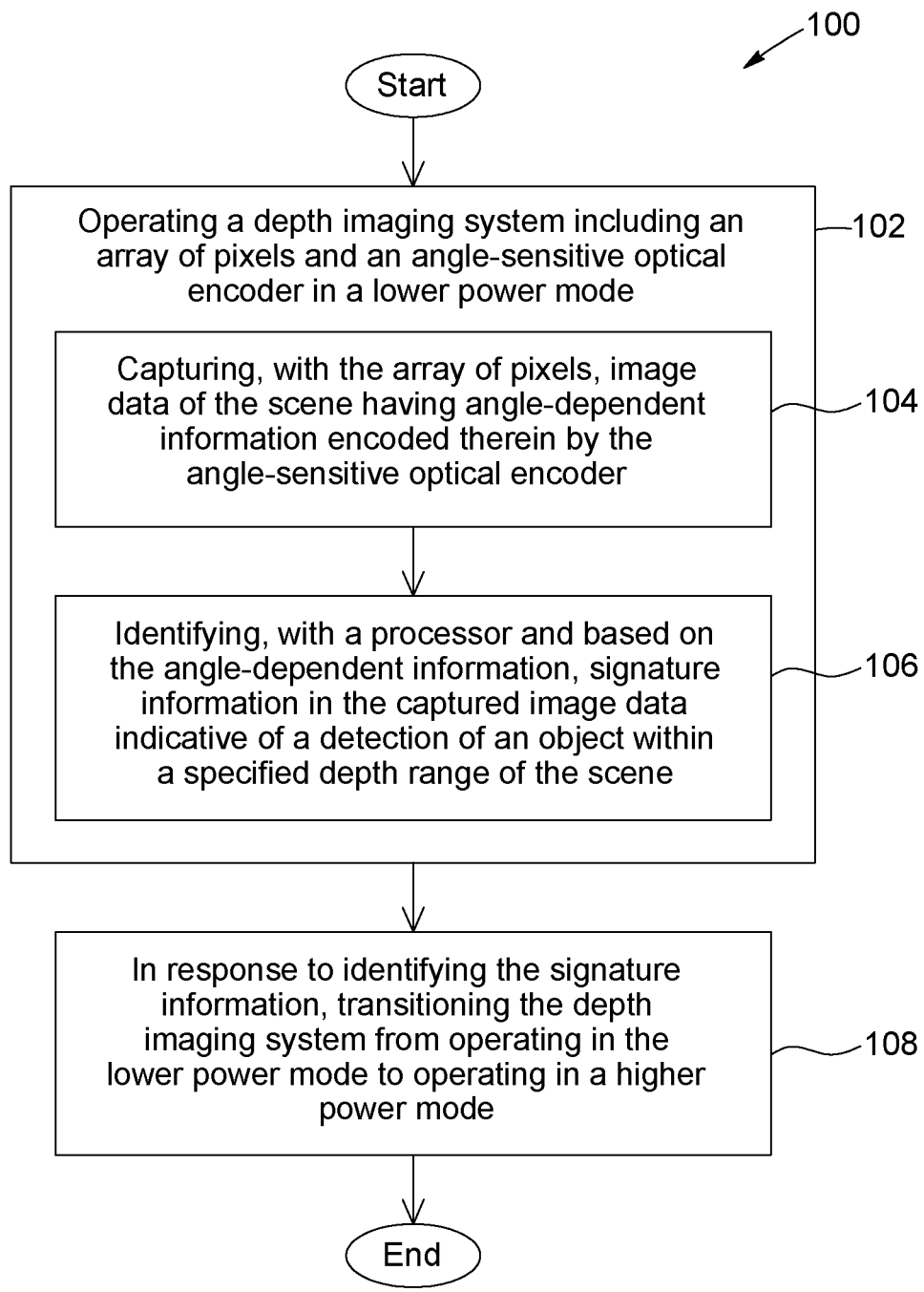
FIG. 1 is a flow diagram of a method of managing power usage of a depth imaging system, in accordance with an embodiment.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. In some embodiments, the present techniques may be used with electromagnetic radiation having a center wavelength ranging 175 nanometers (nm) in the deep ultraviolet to about 300 micrometers (lam) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. However, these wavelength ranges are provided for illustrative purposes, and that the present techniques may operate beyond these ranges.

The present description generally relates to power and energy management techniques in depth imaging applications.

In some embodiments, the present techniques can provide a method of managing power usage of a depth imaging system. The depth imaging system can include an image sensor having an array of pixels configured to detect light incident from a scene, and an angle-sensitive optical encoder interposed between the image sensor and the scene and configured to modulate the incident light detected by the array of pixels in accordance with an angle of incidence of the incident light. For the purpose of making depth imaging more power or energy efficient, the method may be configured to implement a power management approach in which the power consumption level of the depth imaging system is adjusted depending on whether certain the depth features are identified in the captured image data. In some embodiments, the power consumption level of the system can be adjusted by varying the pixel throughput rate of the image sensor, where the pixel throughput rate corresponds to the product of the frame rate and the resolution (i.e., the number of enabled pixels) of the image sensor. In this approach, the depth imaging system may be configured to operate, by default, in a lower power mode corresponding to a first power consumption level. In some embodiments, operating at the first power consumption level can be achieved by using a reduced frame rate and/or a reduced number of enabled pixels for imaging the scene for the purpose of power conservation.

The depth imaging system may also be configured to transition to a higher power mode corresponding to a second power consumption level, higher than the first power consumption level, upon identifying signature information in the captured image data indicative of a detection of an object in a specified depth range of the scene. In some embodiments, operating at the second power consumption level can be achieved by using an increased frame rate and/or an increased number of enabled pixels for imaging the scene for the purpose of enhanced imaging. Once an end condition for leaving the higher power mode has been reached, the depth imaging system may be configured to return to the lower power mode. It is appreciated that by transitioning the depth imaging system from operating in the lower power mode to operating in the higher power mode when an object of interest is detected not only in the field of view of the system, but also within a specified depth range that is relevant to the application, the power consumption of the depth imaging system can be reduced, leading to improved performance. The power management techniques disclosed herein can be advantageous in battery-powered applications (e.g., in outdoor implementations) since they can prolong battery life by increasing the operating time between battery recharge or replacement operations. The present techniques may also reduce heat generated by the depth imaging system, whether in battery-powered applications or not, which can improve the lifetime of the system and reduce or avoid heat-related issues, such as current source instabilities and positive feedback. Furthermore, by measuring depth information using passive angle-sensitive encoders based on diffraction gratings or microlens arrays, the present technique can further reduce power consumption in depth imaging applications.

The present techniques can be used in various applications. Non-limiting examples of possible fields of application include, to name a few, consumer electronics (e.g., mobile phones, tablets, laptops, webcams, notebooks, gaming, virtual and augmented reality, photography), automotive applications (e.g., advanced driver assistance systems, in-cabin monitoring), industrial applications (e.g., inspection, robot guidance, object identification and tracking), and security and surveillance (e.g., biometric anti-spoofing, for example, in facial recognition; motion tracking; traffic monitoring; drones; agricultural inspection with aerial and ground-based drones; doorbell and other security cameras). The present techniques may find use in various applications where power consumption is a concern, which is often the case in continuous and/or battery-powered imaging applications. Non-limiting examples of continuous imaging applications include, to name a few, security, surveillance, and monitoring applications, autonomous robotic navigation, inline inspection, quality control, and metrology. It is appreciated that continuous imaging applications may require significant amount of power to ensure their operation, which can be an issue in battery-powered implementations.

Various aspects and implementations of the present techniques are described below with reference to the figures.

Referring to FIG. 1, there is provided a flow diagram of an embodiment of a method 100 of managing power usage or consumption of a depth imaging system configured for imaging a scene. The depth imaging system includes an image sensor having a plurality of photosensitive pixels and an angle-sensitive optical encoder configured to modulate the incident light detected by the array of pixels in accordance with an angle of incidence of the incident light. The method 100 of FIG. 1 may be implemented in a depth imaging system 200 such as the one depicted in FIG. 2, or another suitable depth imaging system.

Figure 2:
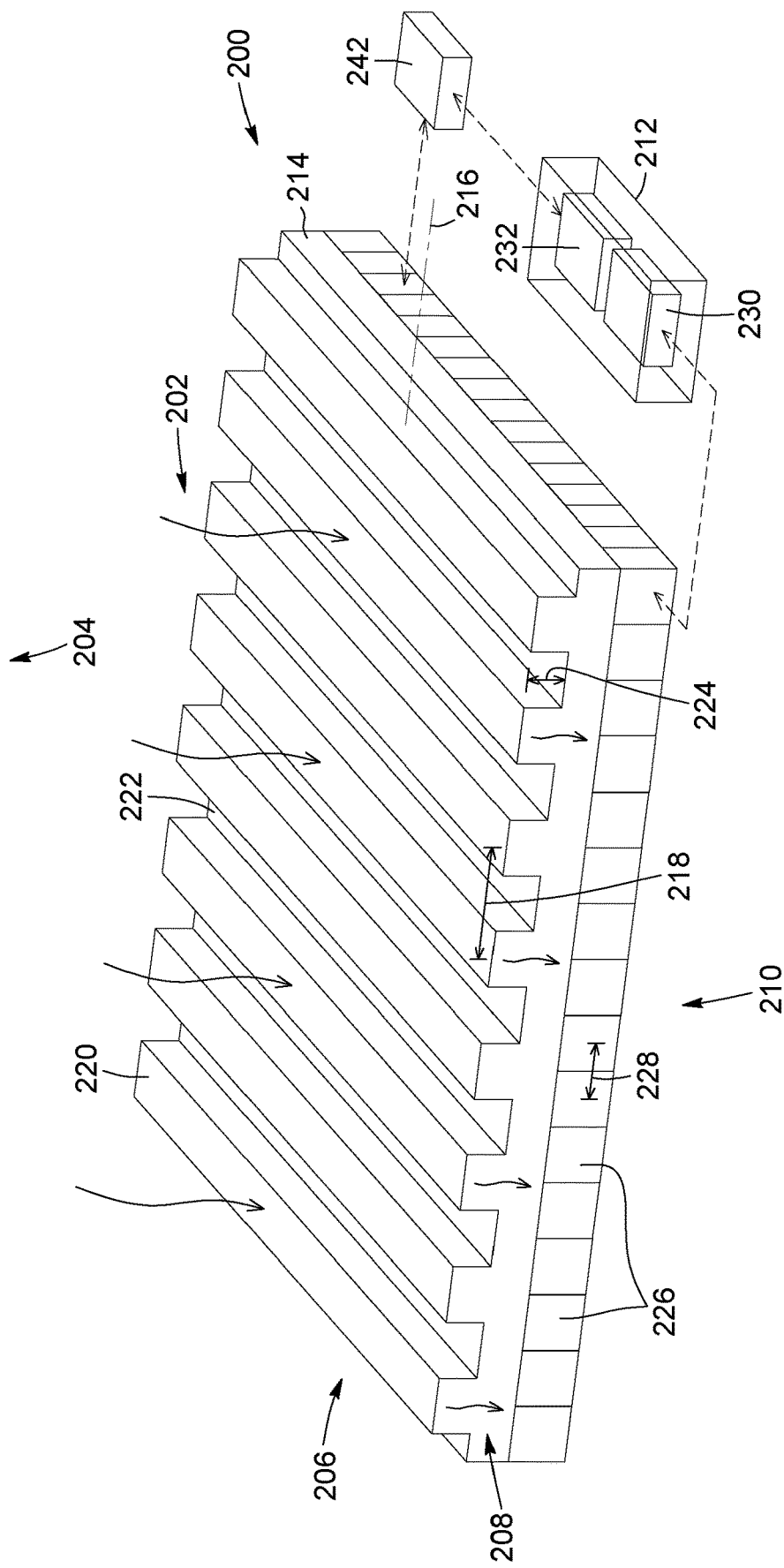
FIG. 2 is a schematic perspective view of a depth imaging system having power usage management capabilities, in accordance with an embodiment.

Referring to FIG. 2, there is provided a schematic representation of an embodiment of a depth imaging system 200 for capturing image data representative of light 202 received from a scene 204 within a field of view of the imaging system 200. In some instances, the term "depth imaging system" may be shortened to "imaging system" for simplicity. The captured image data can convey depth information about the scene 204. The term "scene" refers herein to any region, space, surface, environment, object, target, or information of interest which may be imaged according to the present techniques. Depending on the application, the scene 204 can be an indoor scene or an outdoor scene.

The depth imaging system 200 illustrated in FIG. 2 generally includes an angle-sensitive optical encoder embodied by a transmissive diffraction mask (TDM) 206 configured to diffract the light 202 received from the scene 204 into diffracted light 208 having encoded therein information about the angle of incidence of the received light 202; an image sensor 210 configured to detect the diffracted light 208 and convert the detected diffracted light 208 into image data; a computer device 212 configured to process the image data generated by the image sensor 210 to determine the angle-dependent information about the received light 202, from which depth information about the scene 204 may be determined; and an internal battery 242, from which other components of the depth imaging system 200, including the image sensor 210 and the computer device 212 are configured to draw power. The structure, configuration, and operation of these and other possible components of the depth imaging system 200 are described in greater detail below. It is appreciated that FIG. 2 is a simplified schematic representation that illustrates a number of components of the depth imaging system 200, such that additional features and components that may be useful or necessary for the practical operation of the imaging system 200 may not be specifically depicted. For example, in some embodiments, the imaging system 200 may include a lens assembly or other optics (not shown) disposed in front of the TDM 206 and configured to receive the light 202 from the scene 204 and project it onto the TDM 206. Such a lens assembly may include a single or a plurality of lenses and may be configured to provide various optical functions, for example, autofocus and zoom.

The provision of a passive angle-sensitive optical encoder such as a TDM 206 interposed between the image sensor 210 and the scene 204 can impart the imaging system 200 with 3D imaging capabilities, including depth sensing capabilities. This is because the TDM 206 is configured to diffract the light 202 received thereon into diffracted light 208 whose intensity pattern is spatially modulated in accordance with the direction or angle of incidence of the received light 202. The underlying image sensor 210 is configured to sample, on a per-pixel basis, the intensity pattern of the diffracted light 208 in the near-field to provide image data conveying information indicative of the angle of incidence of the received light 202. The image data may be used or processed in a variety of ways to provide multiple functions including, but not limited to, 3D depth map extraction, 3D surface reconstruction, image refocusing, and the like. Depending on the application, the image data may be acquired as one or more still images or as a video stream.

The structure, configuration, and operation of imaging devices using transmissive diffraction grating structures in front of 2D image sensors to provide 3D imaging capabilities are described in co-assigned international patent applications PCT/CA2017/050686 (published as WO 2017/210781), PCT/CA2018/051554 (published as WO 2019/109182), and PCT/CA2020/050760 (published as WO 2020/243828), as well as in the following master's thesis: Kunnath, Neeth, *Depth from Defocus Using Angle Sensitive Pixels Based on a Transmissive Diffraction Mask* (Master's thesis, McGill University Libraries, 2018). The contents of these four documents are incorporated herein by reference in their entirety. It is appreciated that the theory and applications of such diffraction-based 3D imaging devices are generally known in the art, and need not be described in detail herein other than to facilitate an understanding of the present techniques.

In the embodiment illustrated in FIG. 2, the TDM 206 includes a diffraction grating 214 having a grating axis 216 and a grating profile having a grating period 218 along the grating axis 216. In the illustrated embodiment, the TDM 206 includes a single diffraction grating. However, TDMs including more than one diffraction grating may be used in other embodiments.

The term "diffraction grating", or simply "grating", refers herein to a structure or material having a spatially modulated optical property and which is configured to spatially modulate the amplitude and/or the phase of an optical wavefront incident thereon. The spatially modulated optical property, for example, a refractive index modulation pattern, defines the grating profile. In some embodiments, a diffraction grating may include a periodic arrangement of diffracting elements, for example, alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation, while in phase gratings, these perturbations are the result of a modulation of the relative group velocity of light caused by a spatial variation of the refractive index of the grating structure or material. In several embodiments disclosed herein, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range exist and can be used in some embodiments.

The diffraction grating 214 in FIG. 2 is a transmission phase grating, specifically a binary phase grating whose grating profile is a two-level, square-wave function. The diffraction grating 214 has a grating profile along the grating axis 216. The grating profile includes a series of ridges 220 periodically spaced apart at the grating period 218, interleaved with a series of grooves 222 also periodically spaced apart at the grating period 218. In such a case, the grating period 218 corresponds to the sum of the width, along the first grating axis 216, of one ridge 220 and one adjacent groove 222. The diffraction grating 214 may also be characterized by a duty cycle, defined as the ratio of the ridge width to the grating period 218, and by a step height 224, defined as the difference in level between the ridges 220 and the grooves 222. The step height 224 may provide a predetermined optical path difference between the ridges 220 and the grooves 222. In some embodiments, the grating period 218 may range between about 0.1 μm and about 20 μm, and the step height 224 may range between about 0.1 μm and about 1 μm, although values outside these ranges can be used in other embodiments. In the illustrated embodiment, the diffraction grating 214 has a duty cycle equal to 50%, but other duty cycle values may be used in other embodiments. Depending on the application, the grooves 222 may be empty or filled with a material having a refractive index different from that of the ridge material.

Referring still to FIG. 2, the image sensor 210 includes an array of photosensitive pixels 226. The pixels 226 are configured to detect electromagnetic radiation incident thereon and convert the detected radiation into electrical signals that can be processed to generate image data conveying information about the scene 204. In the illustrated embodiment, each pixel 226 is configured to detect a corresponding portion of the diffracted light 208 produced by the TDM 206 and generate therefrom a respective pixel response. The pixels 226 may each include a light-sensitive region and associated pixel circuitry for processing signals at the pixel level and communicating with other electronics, such as a readout unit. In general, each pixel 226 may be individually addressed and read out. In the illustrated embodiment, the pixels 226 are arranged in an array of rows and columns defined by two orthogonal pixel axes, although other arrangements may be used in other embodiments. In some embodiments, the image sensor 210 may include hundreds of thousands or millions of pixels 226, for example, from about 1080×1920 to about 6000×8000 pixels. However, many other sensor configurations with different pixel arrangements, aspect ratios, and fewer or more pixels are contemplated. Depending on the application, the pixels 226 of the image sensor 210 may or may not be all identical. In some embodiments, the image sensor 210 is a CMOS or a CCD array imager, although other types of photodetector arrays (e.g., charge injection devices or photodiode arrays) may also be used. The image sensor 210 may operate according to a rolling or a global shutter readout scheme, and may be part of a stacked, backside, or frontside illumination sensor architecture. Furthermore, the image sensor 210 may be implemented using various image sensor architectures and pixel array configurations, and may include various additional components. Non-limiting examples of such additional components include, to name a few, microlenses, color filters, color filter isolation structures, light guides, pixel circuitry, and the like. The structure, configuration, and operation of such possible additional components are generally known in the art and need not be described in detail herein.

In some embodiments, the imaging system 200 may be implemented by adding or coupling the TDM 206 on top of an already existing image sensor 210. For example, the existing image sensor 210 may be a conventional CMOS or CCD imager. In other embodiments, the imaging system 200 may be implemented and integrally packaged as a separate, dedicated, and/or custom-designed device incorporating therein all or most of its hardware components, including the TDM 206 and the image sensor 210. It is appreciated that in the embodiment depicted in FIG. 2, the TDM 206 extends over the entire pixel array such that all of the pixels 226 detect diffracted light having passed through the TDM 206. However, in other embodiments, the TDM 206 may cover only a portion of the pixel array such that only a subset of the pixels 226 detects diffracted light.

The array of pixels 226 may be characterized by a pixel pitch 228. The term "pixel pitch" refers herein to the center-to-center distance between nearest-neighbor pixels. In some embodiments, the pixel pitch 228 may range between about 0.7 μm and about 10 μm, although other pixel pitch values may be used in other embodiments. The pixel pitch 228 is defined along the grating axis 216. Depending on the application, the pixel pitch 228 may be less than, equal to, or greater than the grating period 218. For example, in the illustrated embodiment, the grating period 218 is twice as large as the pixel pitch 228. However, other grating-period-to-pixel-pitch ratios, R, may be used in other embodiments. Non-limiting examples of possible ratio values include, to name a few, $R \geq 2$; $R=(n+1)$, where n is a positive integer; $R=2n$, where n is a positive integer; $R=1$; $R=2/(2n+1)$, where n is a positive integer, for example, $n=1$ or 2; and $R=n/m$, where n and m are positive integers larger than two and $m>n$, for example, $n=3$ and $m=4$.

In the embodiment illustrated in FIG. 2, the diffraction grating 214 is disposed over the image sensor 210 such that the center of each ridge 220 is vertically aligned with the midpoint between adjacent pixels 226, and likewise for the center of each groove 222. Different configurations are possible in other embodiments. For example, in some embodiments, the degree of vertical alignment between the TDM 206 and the image sensor 210 may be adjusted in accordance with a chief ray angle (CRA) function or characteristic associated with the imaging system 200. In such a case, the vertical alignment between the TDM 206 and the image sensor 210 may change as a function of position within the pixel array, for example, as one goes from the center to the edge of the array. This means, for example, that depending on its position within the image sensor 210, a given pixel 226 may be vertically aligned with a center of a ridge 220, a center of a groove 222, a transition between a ridge 220 and a groove 222, or some intermediate position of the corresponding overlying diffraction grating 214.

Referring still to FIG. 2, the computer device 212 is operatively coupled to the image sensor 210 to receive therefrom image data about the scene 204. The image data may include a set of pixel responses. The computer device 212 may be configured to determine, from the set of pixel responses, angle-dependent information conveying the angle-of-incidence distribution of the received light 202. The computer device 212 may be configured to determine depth information about the scene 204, for example, a depth map, based on the angle-of-incidence information. The computer device 212 may be provided within one or more general purpose computers and/or within any other suitable devices, implemented in hardware, software, firmware, or any combination thereof, and connected to the components of the imaging system 200 via appropriate wired and/or wireless communication links and interfaces. Depending on the application, the computer device 212 may be fully or partly integrated with, or physically from, the image sensor 210. In some embodiments, the computer device 212 may include a distributed and/or cloud computing network. The computer device 212 can include a processor 230 and a memory 232.

The processor 230 can implement operating systems, and may be able to execute computer programs, also known as commands, instructions, functions, processes, software codes, executables, applications, and the like. While the processor 230 is depicted in FIG. 2 as a single entity for illustrative purposes, the term "processor" should not be construed as being limited to a single processor, and accordingly, any known processor architecture may be used. In some embodiments, the processor 230 can include a plurality of processing units. Such processing units may be physically located within the same device, or the processor 230 may represent the processing functionalities of a plurality of devices operating in coordination. For example, the processor 230 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 232, which may also be referred to as a "computer readable storage medium" is configured to store computer programs and other data to be retrieved by the processor 230. The terms "computer readable storage medium" and "computer readable memory" refer herein to a non-transitory and tangible computer product that can store and communicate executable instructions for the implementation of various steps of the techniques disclosed herein. The memory 232 may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. The memory 232 may be associated with, coupled to, or included in the processor 230, and the processor 230 may be configured to execute instructions contained in a computer program stored in the memory 232 and relating to various functions and operations associated with the processor 230.

The internal battery 242 can be embodied by various types of batteries and be integrated into the depth imaging system 200 according to various arrangements. Non-limiting examples of possible battery types include, to name a few, alkaline batteries, lithium-ion batteries, and nickel-metal hydride (NiMH) batteries. Depending on the application, the internal battery 242 may be rechargeable or non-rechargeable, and may or may not be configured for removal or replacement.

Figure 3A:
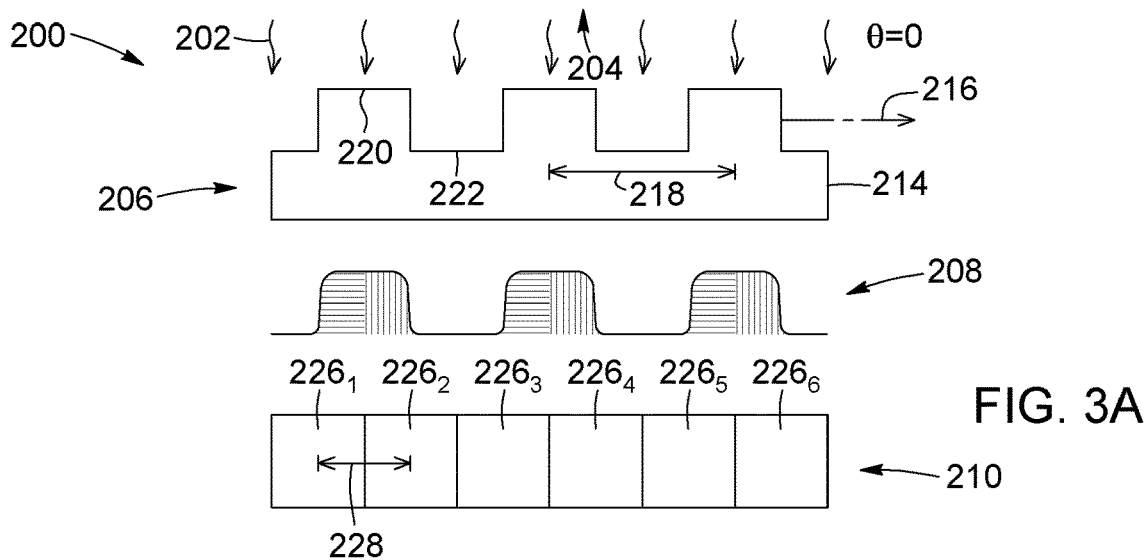
FIGS. 3A to 3C are schematic representations of an example of an imaging system including a transmissive diffractive mask and receiving light with three different angles of incidence $\theta$: normal incidence, $\theta=0$ (FIG. 3A); oblique incidence, $\theta=\theta_{max}>0$ (FIG. 3B); and oblique incidence, $\theta=-\theta_{max}<0$ (FIG. 3C).
Figure 3B:
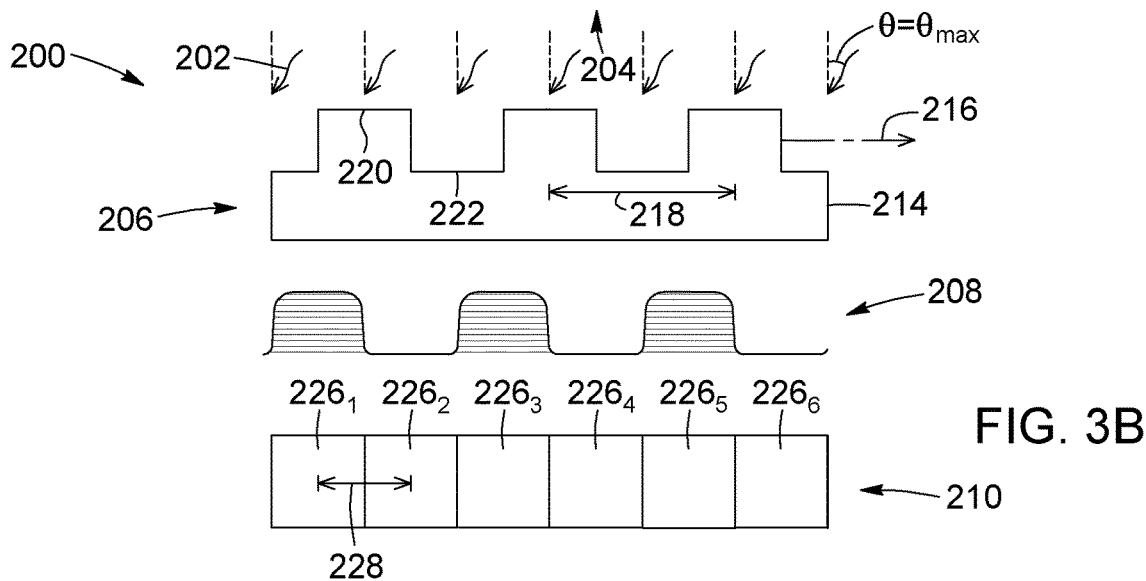
Figure 3C:
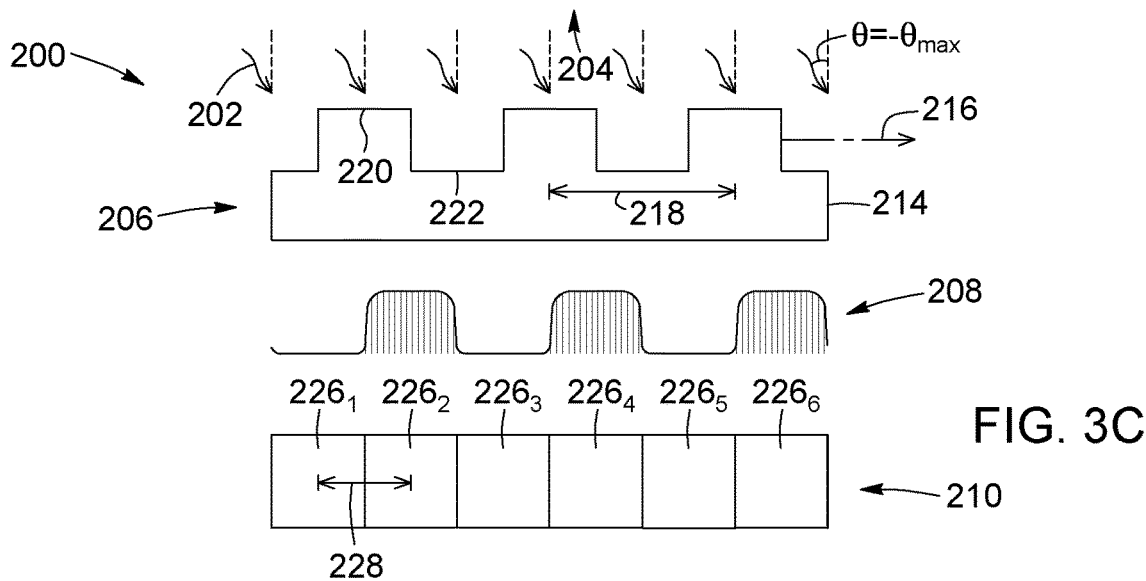

Referring to FIGS. 3A to 3C, the operation of TDM-based imaging systems and how they can be used to provide depth sensing capabilities will be described in greater detail. FIGS. 3A to 3C are schematic representations of an example of a depth imaging system 200 receiving light 202 with three different angles of incidence θ from an observable scene 204 (FIG. 3A: normal incidence, $\theta=0$; FIG. 3B: oblique incidence, $\theta=\theta_{max}>0$; and FIG. 3C: oblique incidence, $\theta=-\theta_{max}<0$). The imaging system 200 includes a TDM 206 and an image sensor 210 disposed under the TDM 206. The TDM 206 includes a binary phase diffraction grating 214 having a grating axis 216 and a grating profile having a grating period 218 and including alternating ridges 220 and grooves 222 with a duty cycle of 50%. The image sensor 210 includes a set of pixels $226_1$-$226_6$. The diffraction grating 214 is disposed over the pixels $226_1$-$226_6$ such that the center of each ridge 220 is vertically aligned with the midpoint between adjacent ones of the pixels $226_1$-$226_6$, and likewise for the center of each groove 222. The grating period 218 is twice as large as the pixel pitch 228.

In operation of the imaging system 200, the diffraction grating 214 receives the light 202 from the scene 204 on its input side, and diffracts the received light 202 to generate, on its output side, diffracted light 208 that travels toward the image sensor 210 for detection by the pixels $226_1$-$226_6$. The diffracted light 208 has an intensity pattern that is spatially modulated based, inter alia, on the geometrical and optical properties of the diffraction grating 214, the angle of incidence θ of the received light 202, and the position of the observation plane (e.g., the light-receiving surfaces of the pixels $226_1$-$226_6$ or an intermediate optical component, such as a microlens array, configured to relay the diffracted light 208 onto the pixels $226_1$-$226_6$). In FIGS. 3A to 3C, the observation plane corresponds to the light-receiving surfaces of the pixels $226_1$-$226_6$. The TDM 206 and the image sensor 210 are disposed relative to each other such that the light-receiving surfaces of the pixels $226_1$-$226_6$ are positioned in the near-field diffraction region of the diffraction grating 214. For example, in order to detect the diffracted light 208 in the near-field, the separation distance between the grating profile of the diffraction grating 214, where the diffracted light 208 is formed, and the light-receiving surface of the pixel array, where the diffracted light 208 is detected, may range between about 0.2 μm and about 20 μm, such as between about 0.5 μm and about 8 μm if the center wavelength of the received light 202 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T = \lambda / [1-(1-\lambda^2/g^2)^{1/2}]$, where $\lambda$ is the wavelength of the light incident on the grating. This expression simplifies to $z_T = 2g^2/\lambda$ when g is sufficiently large compared to $\lambda$. Other self-images are observed at integer multiples of the half Talbot length, that is, at $nz_T/2$. These additional self-images are either in-phase (if n is even) and out-of-phase (if n is odd) by half of the grating period with respect to the self-image observed at $z_T$. Further sub-images with smaller periods can also be observed at smaller fractional values of the Talbot length. These Talbot self-images are observed in the case of amplitude gratings.

In the case of phase gratings, such as the one depicted in FIGS. 3A to 3C, it is the phase of the grating that is self-imaged at integer multiples of the half-Talbot length, which cannot be observed using intensity-sensitive photodetectors. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns, which are sometimes referred to as Lohmann images, can be detected with intensity-sensitive photodetectors.

In the example illustrated in FIGS. 3A to 3C, the diffraction grating 214 and the image sensor 210 are positioned relative to each other so as to detect these Talbot-like, near-field intensity patterns formed at observation planes corresponding to non-integer multiples of the half-Talbot length (i.e., Lohmann images), for example, at $z_T/4$ or $3z_T/4$. In such a case, the diffraction grating 214 is configured to generate, in the observation plane, diffracted light 208 having an intensity pattern that is spatially modulated according to the grating period 218. As depicted in FIGS. 3A to 3C, the intensity pattern of the diffracted light 208 has a spatial period that matches or relates to the grating period 218 and a shape that matches or relates to the grating profile. In FIGS. 3A to 3C, the spatial period of the intensity pattern of the diffracted light 208 is substantially equal to the grating period 218. However, in other embodiments, the spatial period of the intensity pattern of the diffracted light 208 may be a rational fraction of the grating period 218, such as half the grating period 218 in the case of doubled Lohmann images. Each of the pixels $226_1$-$226_6$ of the image sensor 210 is configured to sample a respective portion of the intensity pattern of the diffracted light 208 and to generate therefrom a corresponding intensity-based pixel response. In FIGS. 3A to 3C, the horizontally hatched portions of the intensity pattern of the diffracted light 208 are sampled by the odd pixels $226_1$, $226_3$, $226_5$, while the vertically hatched portions are sampled by the even pixels $226_2$, $226_4$, $226_6$.

Another property of Lohmann self-images is that they shift laterally along the grating axis 216 upon varying the angle of incidence θ of the received light 202, while substantially retaining their period and shape. This can be seen from a comparison between the intensity pattern of the diffracted lights 208 illustrated in FIGS. 3A to 3C. The diffraction grating 214 is configured to impart an asymmetric angle-dependent spatial modulation to the intensity pattern of the diffracted light 208, which is sampled by the pixels $226_1$-$226_6$. By controlling the vertical alignment between the diffraction grating 214 and the image sensor 210 and the relationship between the grating period 218 and the pixel pitch 228, the intensities measured by the individual pixels $226_1$-$226_6$ for a given intensity of the received light 202 will vary as a function of the angle of incidence θ due to the lateral shifts experienced by the diffracted light 208. For example, in FIGS. 3A to 3C, the intensities measured by the odd pixels $226_1$, $226_3$, $226_5$ are respectively equal to (FIG. 3A), greater than (FIG. 3B), and less than (FIG. 3C) the intensities measured by the even pixels $226_2$, $226_4$, $226_6$. The angle-dependent information encoded by the diffraction grating 214 into the intensity pattern of the diffracted light 208 recorded by the image sensor 210 as a set of individual intensity-based pixel responses can be extracted, decoded, or otherwise retrieved to provide depth information about the scene 204.

Figure 4:
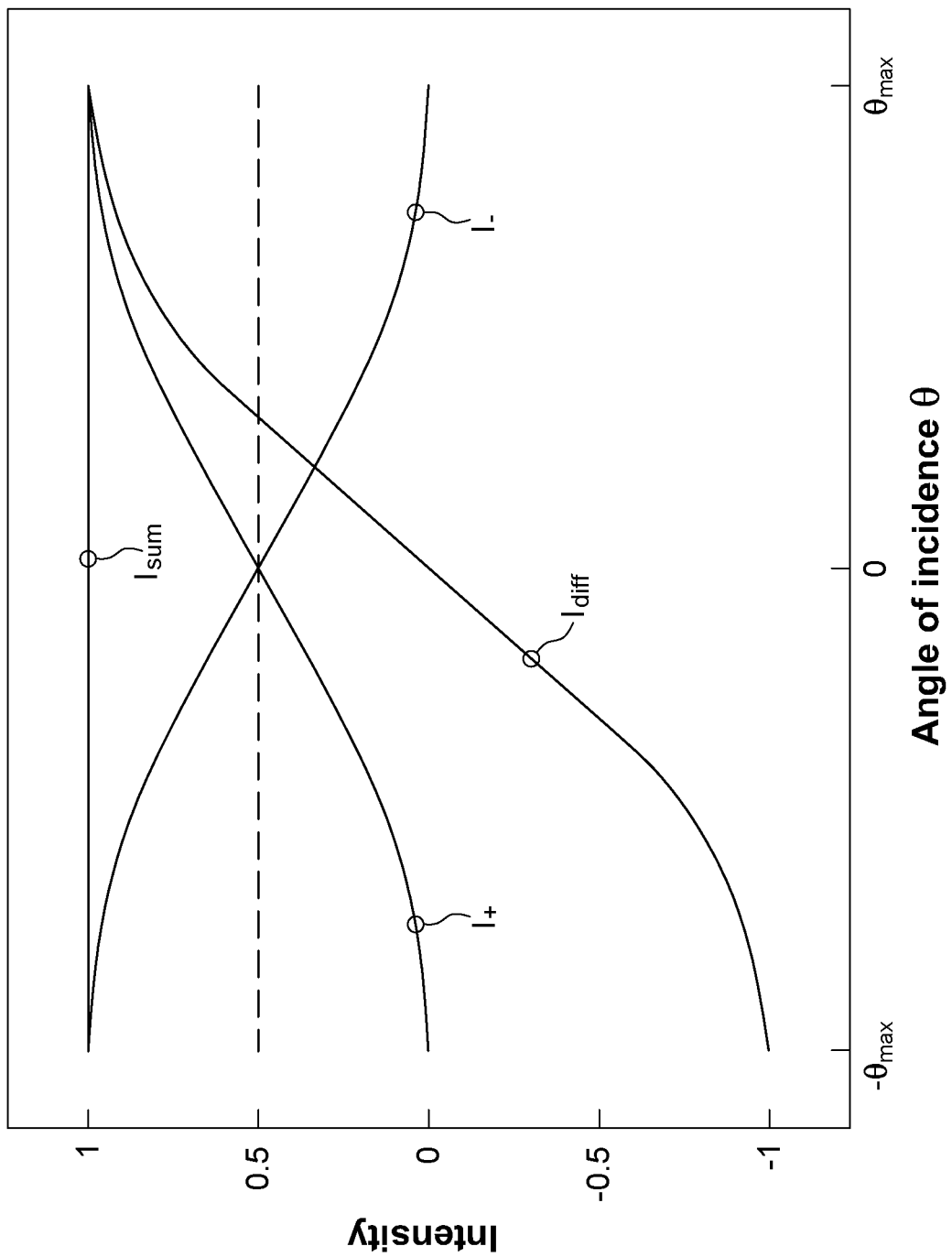
FIG. 4 is a graph depicting curves of the individual pixel responses of the odd pixels ($I_+$) and the even pixels ($I_-$) of the imaging system illustrated in FIGS. 3A to 3C, plotted as functions of the angle of incidence $\theta$, for a given intensity of incident light.

Referring to FIG. 4, there are depicted curves of the individual pixel responses of the odd pixels $226_1$, $226_3$, $226_5$ ($I_+$) and the even pixels $226_2$, $226_4$, $226_6$ ($I_-$) of FIGS. 3A to 3C, plotted as functions of the angle of incidence θ, for a given intensity of incident light. FIG. 4 assumes that the intensity of the incident light is equal to one and that there is a modulation depth of substantially 100% between $\theta = \pm\theta_{max}$, where the maxima of the diffracted intensity pattern are centered on either the odd pixels $226_1$, $226_3$, $226_5$ or the even pixels $226_2$, $226_4$, $226_6$ (peak modulated level), and 0=0, where the maxima of the diffracted intensity pattern are centered on the transitions between the odd pixels $226_1$, $226_3$, $226_5$ or the even pixels $226_2$, $226_4$, $226_6$ (unmodulated level). It is seen that $I_+$ and $I_-$ have complementary asymmetrical angular responses, where $I_+$ and $I_-$ are mirror functions of each other with respect to the unmodulated level axis (dashed line in FIG. 4), and where $I_+$ and $I_-$ respectively increases and decreases as θ increases. FIG. 4 also depicts curves of the sum $I_{sum} = I_+ + I_-$ and the difference $I_{diff} = I_+ - I_-$ of the odd and even pixel responses as functions of θ.

It is appreciated that since the intensities $I_+$ and $I_-$ vary in a complementary way as a function of θ, their sum $I_{sum}$ remains, in principle, independent of θ. In practice, $I_{sum}$ can be controlled to remain largely independent of θ, or at least symmetrical with respect to θ (i.e., so that $I_{sum}(\theta) = I_{sum}(-\theta)$. The summed pixel response, $I_{sum}$, is similar to the signal that would be obtained by the pixels $226_1$-$226_6$ in the absence of the diffraction grating 214, and thus can provide 2D intensity image information, with no or little angle-dependent information encoded therein. The differential pixel response, $I_{diff}$, varies asymmetrically as a function of θ and represents a measurement of the angle-of-incidence information encoded into the diffracted light 208 by the diffraction grating 214. The pixel responses $I_+$, $I_-$, $I_{sum}$, and $I_{diff}$ may be expressed mathematically as follows:

Equations (2) and (3) imply that each summed pixel response $I_{sum}$ is obtained by summing one odd pixel response $I_+$ and one even pixel response $I_-$, and that each differential pixel response $I_{diff}$ is obtained by subtracting one even pixel response $I_-$ from one odd pixel response $I_+$. Such an approach may be viewed as a 2×1 binning mode. However, other approaches can be used to determine summed and differential pixel responses $I_{sum}$ and $I_{diff}$, for example, a 2×2 binning mode (e.g., $I_{sum}=I_{1+}+I_{1-}+I_{2+}+I_{2-}$ and $I_{diff}=I_{1+}-I_{1-}+I_{2+}-I_{2-}$, where $I_{1\pm}$ is a first pair of odd and even pixel responses and $I_{2\pm}$ is an adjacent second pair of odd and even pixel responses) or a convolution mode (e.g., using a kernel such that $I_{sum}$ and $I_{diff}$ have the same pixel resolution as $I_+$ and $I_-$). In this regard, the term "differential" is used herein to denote not only a simple subtraction between two pixel responses, but also a more complex differential operation from which a difference between two or more pixel responses is obtained. Furthermore, although the example of FIGS. 3A to 3C defines two groups of pixels 226 with different pixel responses as a function of the angle of incidence (i.e., the odd pixels $226_1$, $226_3$, $226_5$ and the even pixels $226_2$, $226_4$, $226_6$), other embodiments may define groups composed of more than two pixels with different angular responses.

The summed and differential pixel responses, $I_{sum}$ and $I_{diff}$, may be processed to provide depth information about the scene 204. In some embodiments, the summed and differential pixel responses $I_{sum}$ and $I_{diff}$ from all the odd-even pixel pairs or groups (also referred to as TDM pixel pairs or groups) may be used to provide a TDM disparity map. The TDM disparity map is made of a set of TDM disparities, one for each odd-even pixel pair or group. The TDM disparity map is representative of the difference between the viewpoint of the scene 204 provided by the odd pixels $226_1$, $226_3$, $226_5$ and the viewpoint of the scene 204 provided by the even pixels $226_2$, $226_4$, $226_6$. Stated otherwise, the odd pixel responses $I_+$ and the even pixel responses $I_-$ can provide two slightly different views of the scene 204, separated by an effective baseline distance. The TDM baseline distance can depend, inter alia, on the modulation depth parameter m and the numerical aperture of the imaging optics (e.g., the lens diameter). The TDM disparity map can be processed to generate a depth map of the scene 204.

Figure 5:
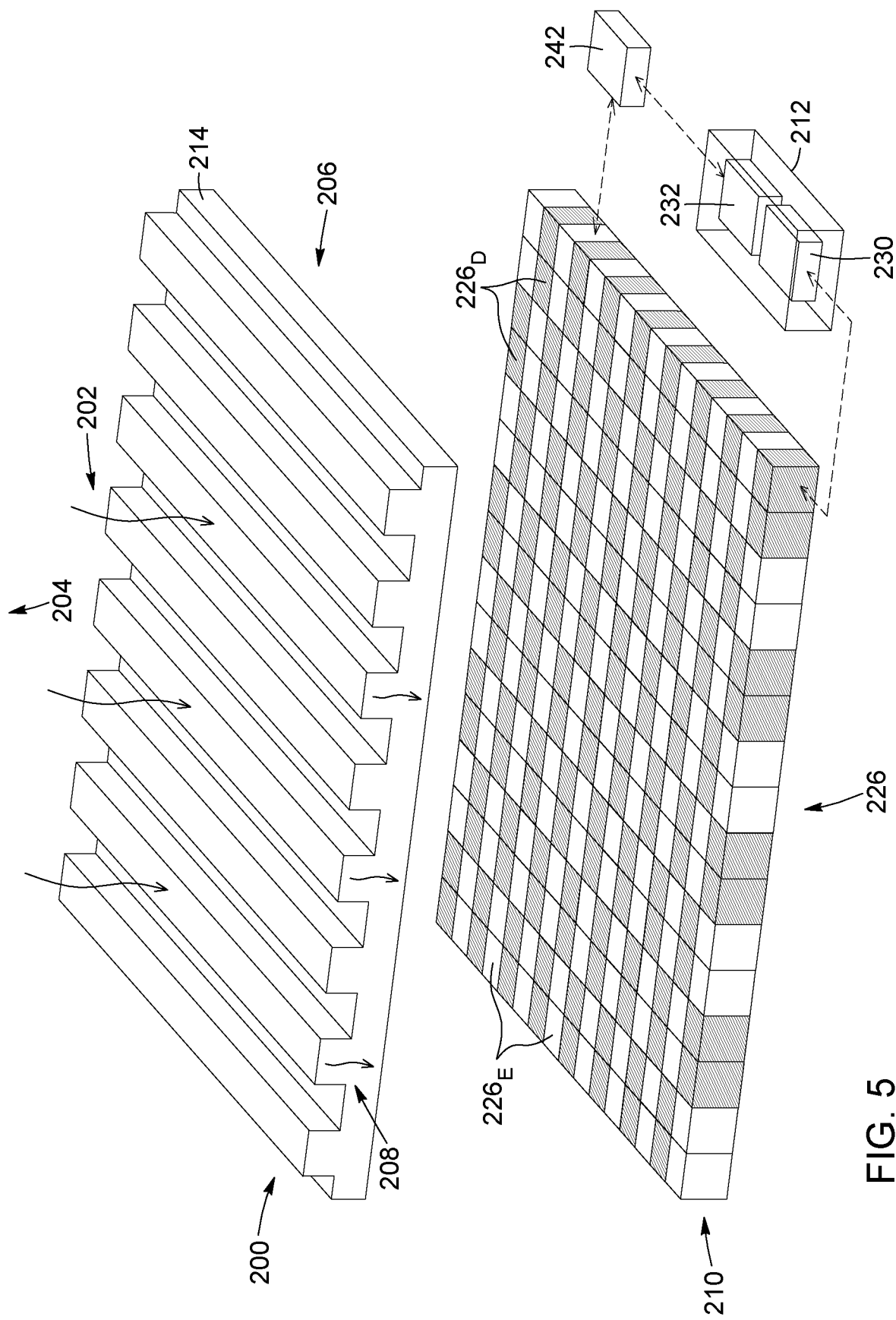
FIG. 5 is a schematic partially exploded perspective view of a depth imaging system having power usage management capabilities, in accordance with an embodiment, wherein the depth imaging system is operating in a lower power mode.

Returning to FIG. 1, the power management method 100 can include a step 102 of operating a depth imaging system an array of pixels and an angle-sensitive optical encoder in a lower power mode that corresponds to a first power consumption level of the depth imaging system. FIG. 5 is a schematic partially exploded perspective view of an embodiment of a depth imaging system 200 operating in a lower power mode. The depth imaging system 200 illustrated in FIG. 5 generally includes an image sensor 210 having an array of pixels 226 configured to detect light 202 incident from a scene 204; an angle-sensitive optical encoder embodied by a TDM 206 interposed between the image sensor 210 and the scene 204 and configured to modulate the incident light 202 reaching the array of pixels 226 in accordance with an angle of incidence of the incident light 202; a computer device 212 having a processor 230 and a memory 232 and configured to process the image data generated by the image sensor 210 to determine angle-dependent information about the incident light 202, from which depth information about the scene 204 may be determined; and an internal battery 242 configured to supply power to other components of the depth imaging system 200, including the image sensor 210 and the computer device 212. It is noted that the embodiment of FIG. 5 shares several features with the embodiment of FIG. 2, which will not be described again other than to highlight differences between them.

In the embodiment of FIG. 5, the first power consumption level in the lower power mode is adjusted by operating the depth imaging system 200 at a first pixel throughput rate. The first pixel throughput rate is lower than a second pixel throughput rate at which the depth imaging system 200 is configured to operate when in a higher power mode, as discussed below with reference to FIG. 6. The pixel throughput rate of the depth imaging system 200 refers herein to the number of pixels that the system 200 is configured to output per unit time. The first pixel throughput rate can be defined in terms of the product of a first frame rate and a first number of enabled pixels (i.e., a first resolution) for capturing image data of the scene 204 in the lower power mode. Likewise, the second pixel throughput rate can be defined in terms of the product of a second frame rate and a second number of enabled pixels (i.e., a second resolution) for capturing image data of the scene 204 in the higher power mode. Depending on the application, the condition that the first power consumption level in the lower power mode is lower than the second power consumption level in the higher power mode can be achieved by setting the first frame rate to be lower than the second frame and/or by setting the first number of enabled pixels to be less than the second number of enabled pixels. In some embodiments, a ratio of the second number of enabled pixels to the first number of enabled pixels can range from 2 to 1000, and a ratio of the second frame rate to the first frame rate can range from slightly greater than one to 100, although other ratio values can be used in other embodiments.

In the embodiment of FIG. 5, the pixels 226 of the image sensor 210 include enabled (or active) pixels $226_E$, which are used for imaging in the lower power mode, and disabled (or inactive) pixels $226_D$, depicted with hatching, which are not used for imaging in the lower power mode. Depending on the application, the first frame rate in the lower power mode may or may not be reduced compared to the second frame rate in the higher power mode.

In some implementations, a disabled pixel may be a pixel configured to not even generate an analog signal (e.g., an analog voltage) when exposed to incident light. In other implementations, a disabled pixel may be a pixel configured to generate an analog signal when exposed to incident light, but where the analog signal is not digitized into a digital signal for further processing in the image signal processor (ISP) pipeline. In yet other implementations, a disabled pixel may be a pixel configured to generate an analog signal (e.g., an analog voltage) when exposed to incident light, where the analog signal is digitized into a digital signal but not processed as image data in the ISP pipeline.

Depending on the application, the depth imaging system 200 in FIG. 5 may be configured to operate in the lower power mode by default (e.g., when the depth imaging system 200 is started or shortly thereafter), upon user request or command, or upon reaching certain operating conditions (e.g., a battery charge state, or environmental conditions, such as temperature or lighting conditions).

It is appreciated that the use of a lower-resolution, pixel-subsampling approach to imaging the scene 204 in the lower power mode can reduce power consumption by disabling, deactivating, bypassing, turning off, powering down, or otherwise not using, in full or in part, one or more components of the depth imaging system 200 during image capture, readout, and/or processing. In other words, the number of pixels to be read-out, processed, or otherwise used for imaging is less in the lower power mode, resulting in reduced power consumption. Non-limiting examples of components of the depth imaging system 200 whose power consumption can be reduced in the lower power mode include, to name a few, analog-to-digital converters and image signal processors. It is appreciated that any technique for disabling or otherwise not operating one or more components of the depth imaging system 200, or portions thereof, may be used to implement the lower power mode. For example, in a global shutter readout mode, each row of pixels generally has a dedicated analog-to-digital converter. If any pixel row is skipped in the lower power mode, power may be saved by disabling that particular analog-to-digital converter. It is also appreciated that the use of a lower-frame-rate approach to imaging the scene, in combination or not with a pixel-subsampling approach, may reduce the average power consumption of the depth imaging system 200 during image capture, readout, and/or processing.

In the embodiment illustrated in FIG. 5, the number enabled pixels $226_E$ in the lower power mode is equal to half of the total number of pixels 226 in the image sensor 210, corresponding to a sub-sampling ratio of ½. Furthermore, the enabled pixels $226_E$ and the disabled pixels $226_D$ are arranged so as define a set of enabled pixel pairs and a set of disabled pixel pairs, where the set of enabled pixel pairs and the set of disabled pixel pairs are interleaved in rows and columns to define a checkerboard pattern. However, various other sub-sampling ratios (e.g., ¼, ⅛, 1/10, 1/16, 1/32, 1/64, 1/100, 1/1000) and various other arrangements of the enabled and disabled pixels $226_E$, $226_D$, whether regular or irregular, can be used in other embodiments, provided that depth information about the scene 204 can be obtained from the pixel responses of the enabled pixels $226_E$. For example, the depth information can be obtained using summed and differential pixel responses $I_{sum}$ and $I_{diff}$ derived from the odd and even pixel responses $I_+$ and $I_-$, or directly from the odd and even pixel responses $I_+$ and $I_-$ themselves, as the case may be.

In general, the greater the number of enabled pixels $226_E$, the higher the image quality but the higher the power consumption, and likewise for the frame rate. Thus, depending on whether power consumption or image quality is favored, the frame rate and the sub-sampling ratio in the lower power mode may be adjusted to suit the needs or preferences of a particular application. In some embodiments, the method 100 can include a step of setting or adjusting the first power consumption level of the lower power mode (e.g., the first frame rate and/or the first number of enabled pixels $226_E$) based on operating conditions of the depth imaging system. In some embodiments, the operating conditions can include a charge state of the internal battery 242; one or more environmental conditions associated with the scene 204, for example, lighting conditions or temperature conditions, whether indoor or outdoor; or an intended use case or application associated with the operation of the depth imaging system 200; or any combination thereof. In some embodiments, the sub-sampling ratio and the arrangement of the enabled and disabled pixels $226_E$, $226_D$ can be uniform or vary as a function of position within the image sensor 210. For example, the density of enabled pixels $226_E$ can be higher near the center of the pixel array that near the edge. In some embodiments, the sub-sampling ratio and the arrangement of the enabled and disabled pixels $226_E$, $226_D$ may each vary as a function of time and/or as a function of other operating conditions. The first frame rate may also be adjusted as a function of time and/or other operating conditions. For example, in some embodiments, the first frame rate and/or the sub-sampling ratio may be set or adjusted based on the current charge level or rate of discharge of the internal battery 242 when entering the lower power mode, so that the lower the battery charge level, the lower the first frame rate and/or the smaller the number of enabled pixels $226_E$ in the lower power mode.

Depending on the application, the selection of the sub-sampling ratio and/or the reduced frame rate to be used in the lower power mode can be made with or without user input. For example, in some embodiments, the selection of the sub-sampling ratio and/or the reduced frame rate can be made by a user selecting, via the processor 230, a use case associated with the operation of the depth imaging system 200 from a use case database stored in the memory 232. The use case database may store use case information about various possible use cases associated with the depth imaging system 200. The use case information may include a frame rate and/or a sub-sampling ratio and an arrangement of enabled and disabled pixels $226_E$, $226_D$ to be used for a given use case. Non-limiting examples of possible use cases include, to name a few, a surveillance or doorbell camera use case; a robotic vacuum cleaner use case; an autonomous drone use case; a presence authentication for screen unlocking use case; and a facial recognition use case. Upon selection of a use case from the use case database, the processor 230 may be configured to control the operation of the depth imaging system 200 in the lower power mode in accordance with the reduced frame rate and/or the sub-sampling ratio and enabled-disabled pixel arrangement associated with the selected use case.

In the method 100 of FIG. 1, the step 102 of operating the depth imaging system 200 in the lower power mode can include a step 104 of capturing, with the array of pixels 226 (e.g., the enabled pixels $226_E$ in the case of FIG. 5), image data of the scene 204, where the captured image data has angle-dependent information encoded therein by the TDM 206. It is appreciated that the acquisition of image data with encoded depth information using diffraction-grating-based imaging devices is known in the art and can be performed such as described above. For example, in some embodiments, the step 104 capturing the image data can include capturing the image data as (1) a first set of pixel responses (e.g., a set of odd pixel responses $I_+$) corresponding to a first set of pixels (e.g., a set of odd pixels) of the array of pixels 226, and (2) a second set of pixel responses (e.g., a set of even pixel responses $I_-$) corresponding to a second set of pixels (e.g., a set of even pixels) of the array of pixels 226, wherein the first set of pixel responses and the second set of pixel responses vary differently from each other with the angle of incidence of the incident light 202 due to the modulation imparted by the angle-sensitive optical encoder (e.g., the TDM 206). For example, the pixel responses of the first set can have magnitudes that increase as the angle of incidence increases, while the pixel responses of the second set can have magnitudes that decrease as the angle of incidence increases. Depending on the application, the step 104 of capturing image data in the lower power mode can be performed as a continuous or an intermittent (e.g., periodic) process, and the image data may be captured as one or more still images or as a video stream.

Figure 7:
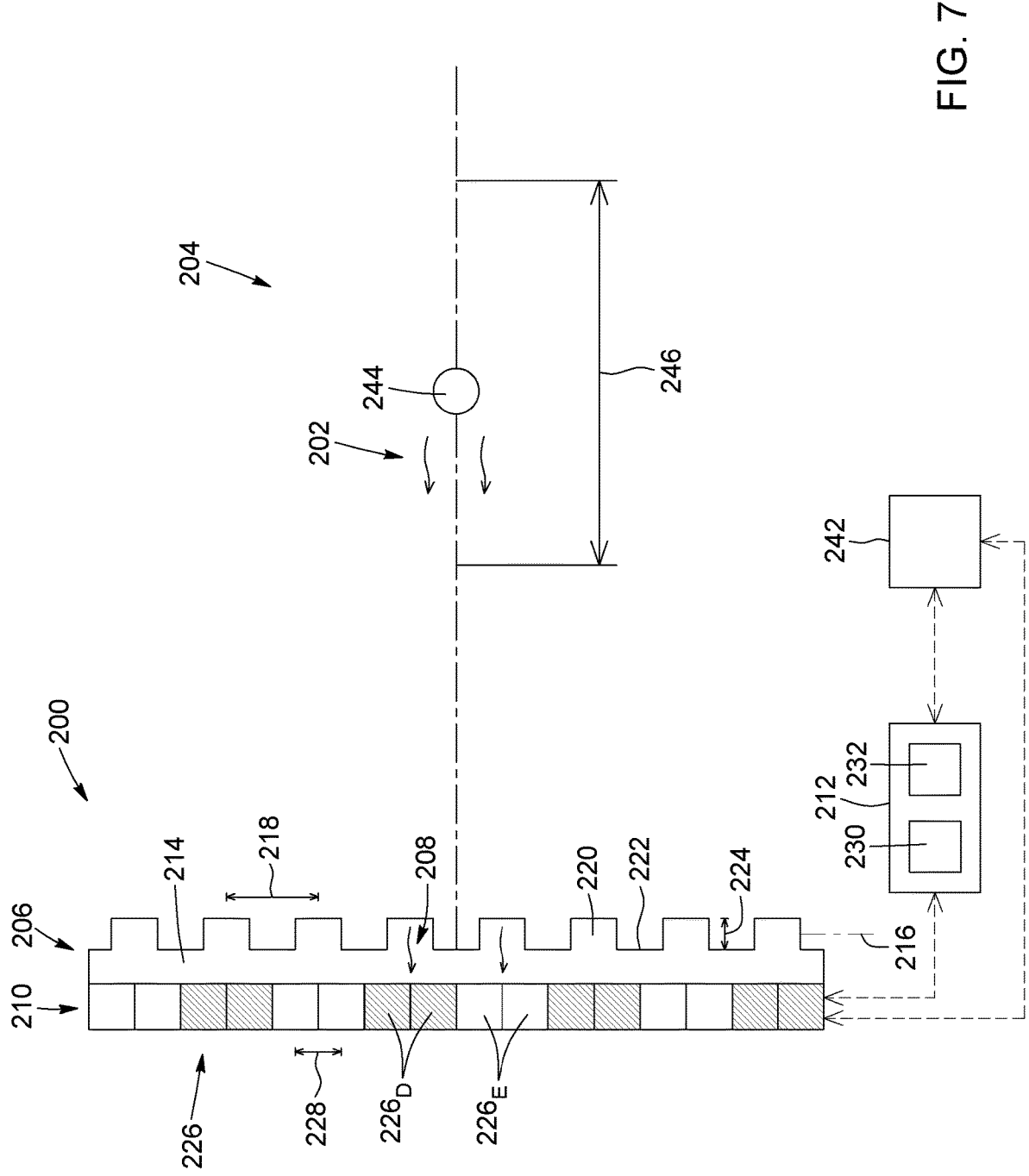
FIG. 7 is a schematic side view of the depth imaging system of FIG. 5, depicting the identification of an object within a specified depth range.

Referring still to FIG. 1, along with FIG. 7, the step 102 of operating the depth imaging system 200 in the lower power mode can include a step 106 of identifying, with the processor 230 and based on the angle-dependent information encoded by the TDM 206, signature information in the captured image data indicative of a detection of an object within a specified depth range of the scene 204. FIG. 7 is a schematic side view of the depth imaging system 200 of FIG. 5, which depicts an example of the detection of an object 244 within a specified depth range 246 of the scene 204. In some embodiments, the step of identifying the signature information in the captured image data can include operations of computing a plurality of summed pixel responses $I_{sum}$ based on a sum operation between a first set of pixel responses (e.g., a set of odd pixel responses $I_+$) and a second set of pixel responses (e.g., a set of even pixel responses $I_-$), as provided by Equation (2); computing a plurality of differential pixel responses $I_{diff}$ based on a difference operation between the first set of pixel responses (e.g., a set of odd pixel responses $I_+$) and the second set of pixel responses (e.g., a set of even pixel responses $I_-$), as provided by Equation (3); and determining the angle-dependent information based on the plurality of summed pixel responses $I_{sum}$ and the plurality of differential pixel responses $I_{diff}$. Once the angle-dependent information encoded in the captured image data has been determined, it can be used to detect signature information of an object 244 within the specified depth range 246. Depending on the application, the image data capture step 104 and the signature identification step 106 may be performed concurrently (e.g., new image data is captured while previously captured image data is analyzed for signature information) or in an alternating sequential manner (e.g., first image data capture, followed by first image data analysis, followed by second image data capture, followed by second image data analysis, and so forth).

The term "object" refers herein to any physical entity whose presence can be monitored or detected within a specified depth range using the present techniques. The object can be a person, an animal, a vehicle, furniture, or any other animate and inanimate detectable feature in a scene. The term "object" is not meant to be restricted with respect to size, shape, color, optical properties, or any other object parameters. Depending on the application, the object may be moving or stationary with respect to the depth imaging system 200. Furthermore, the object can be a single object or a plurality of objects.

The specified depth range 246 to be used can vary depending on the application. For example, in surveillance applications (e.g., doorbell camera systems), the specified depth range 246 may range from about one meter to a few meters, while in robotic vacuum cleaner and facial recognition applications, the specified depth range 246 may range from a few centimeters to a few tens of centimeters. It is appreciated that by monitoring only a limited depth range of the scene 204 at a reduced frame rate and/or with a limited number of enabled pixels $226_E$ of the image sensor 210, the power consumption of the depth image system 200 can be reduced. Depending on the application, the selection of the specified depth range 246 to be used in the lower power mode can be made with or without user input. In some embodiments, the selection of the specified depth range 246 can be made by a user selecting, via the processor 230, a use case associated with the operation of the depth imaging system 200 from a use case database stored in the memory 232. The use case database may store use case information about various possible use cases, including not only information about the frame rate and/or the sub-sampling ratio and the enabled-disabled pixel arrangement, as mentioned above, but also information about the specified depth range 246 to be used for a given use case. Upon selection of a use case from the use database, the processor 230 may be configured to perform the signature information identification step 106 in accordance with the specified depth range 246 associated with the selected use case.

In some embodiments, the signature information identified at step 106 can consist solely of a presence of the object 244 within the specified depth range 246. This means that the identification of the presence of the object 244 is a sufficient condition for concluding that an object detection has occurred and that the signature information has been identified. In such embodiments, an object is considered an object of interest only by virtue of its presence in the specified depth range 246, irrespective of any of its characteristics.

In other embodiments, the signature information identified at step 106 can include not only a presence of the object 244 within the specified depth range 246, but also at least one additional characteristic of the detected object 244. This means that the identification of an object 244 being present in the specified depth range 246 is insufficient, by itself, to determine that the signature information has been identified. In such embodiments, an object 244 is considered an object of interest both by virtue of its presence in the specified depth range 246 and by the fact that it possesses one or more specified characteristics. Non-limiting examples of additional object characteristics that can be assessed in the step 106 of identifying signature information include, to name a few, an object type (e.g., person, animal, inanimate object), an object size, an object shape, an object position within the specified depth range (e.g., a depth within the specified depth range and/or an object position within a plane transverse to the optical axis of the depth imaging system 200, along which the specified depth range is defined), an object orientation or pose, an object motion (e.g., an object speed and/or an object direction of motion), an object optical property (e.g., color, refractive index, transmittance, reflectance), or any combination thereof.

It is appreciated that while the presence of an object in the specified depth range is assessed by analyzing the angle-dependent information encoded by the angle-sensitive optical encoder in the image data captured at step 104 (e.g., from $I_{sum}$ and $I_{diff}$ and/or from $I_\pm$), the one or more additional object characteristics (e.g., object type, size, shape, and the like) can be assessed by analyzing angle-dependent information and/or 2D image information contained in the captured image data.

The nature of the signature information to be assessed may vary depending on the application. For example, in surveillance and facial recognition applications, a person may be an object of interest, but an animal or an inanimate object may not, while in robotic vacuum cleaner applications, any animate or inanimate object obstructing a robot path may be an object of interest. The selection of the one or more object characteristics to be assessed in a given application can be made with or without user input. In some embodiments, the selection of the one or more object characteristics can be made by a user selecting, via the processor 230, a use case associated with the operation of the depth imaging system 200 from a use case database stored in the memory 232. The use case database may store use case information about various possible use cases, including not only information about the reduced frame rate, the sub-sampling ratio, the enabled-disabled pixel arrangement, and the specified depth range 246, as mentioned above, but also information about the nature of the signature information to be assessed for a given use case. Upon selection of a use case from the use case database, the processor 230 may be configured to perform the signature information identification step 106 in accordance with the nature of the signature information associated with the selected use case.

In some embodiments, the identification of signature information in the image data captured at step 104 may include using object recognition techniques. It is appreciated that a variety of computer-implemented and software-based analytical and/or numerical tools and techniques may be employed to perform object recognition by finding a match between an object identified in the captured image data and a set of reference objects stored in memory. Such tools and techniques may use matching algorithms based on feature extraction and pattern recognition, and may rely on machine learning and/or artificial intelligence.

In some embodiments, the method 100 may include a step of generating an alert in response to a determination that an object 244 of interest is present in the specified depth range 246. The alert may be an audible alert, a visual alert, a tactile alert, a vibrational alert, or any combination thereof. The alert may convey information about one or more characteristics of the object identified as being present the specified depth range (e.g., type, position in the field of view, depth, shape, size, and the like). The depth imaging system 200 may include an output device for generating the alert and/or be configured to transmit the alert to an external device (e.g., an user's mobile device) using wired and/or wireless communication links. The alert may include a request or a recommendation to perform one or more actions.

Figure 6:
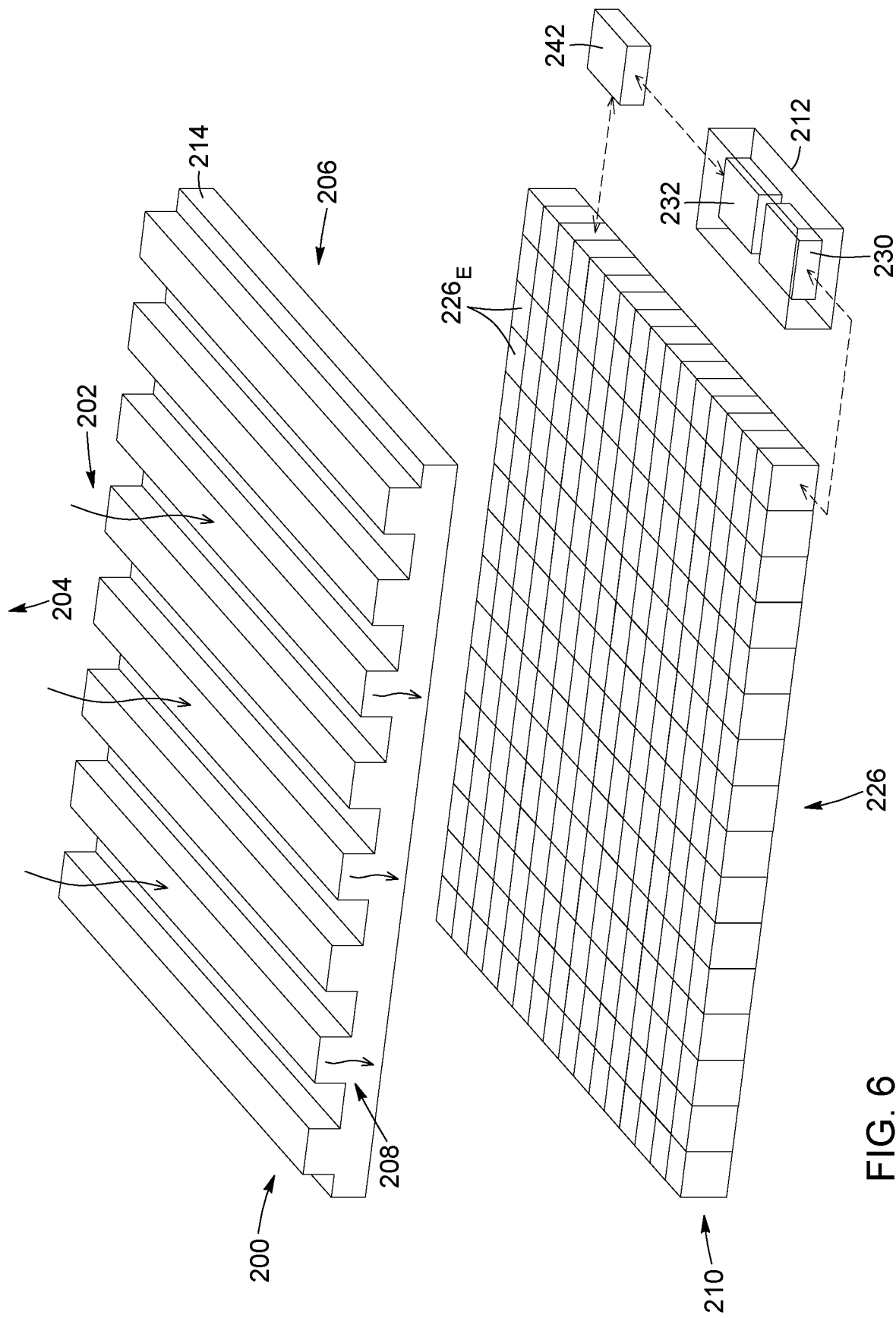
FIG. 6 is a schematic partially exploded perspective view of the depth imaging system of FIG. 5, wherein the depth imaging system is operating in a higher power mode.

Referring still to FIG. 1, in response to identifying the signature information conveying the detection of an object 244 within the specified depth range 246, the method 100 can include a step 108 of transitioning the depth imaging system 200 from operating in the lower power mode to operating in a higher power mode corresponding to a second power consumption level higher than the first power consumption level associated with the lower power mode. However, if it is determined at step 106 that there is no object of interest in the specified depth range 246, the method 100 may continue operating the depth imaging system 200 in the lower power mode. FIG. 6 is a schematic partially exploded perspective view of the depth imaging system 200 of FIG. 5 after having transitioned from operating in a lower power mode to operating in the higher power mode. In some embodiments, the second power consumption level can be achieved by increasing the pixel throughput rate of the system 200 in the higher power mode compared to the pixel throughput rate used in the lower power mode. As noted above, increasing the pixel throughput rate of the system 200 can be achieved by using an increased frame rate and/or an increased number of enabled pixels $226_E$ for image capture. In the embodiment of FIG. 6, all the pixels 226 of the array are enabled pixels 226 in the higher power mode. However, in other embodiments, the number of enabled pixels $226_E$ used in the higher power mode may be less than the total number of pixels 226 of the array, as long as it is greater than the reduced number of enabled pixels $226_E$ used in the lower power mode. It is also appreciated that the increased frame rate used in the higher power mode may be less than the maximum frame rate achievable by the system 200, as long as it is higher than the reduced frame rate used in the lower power mode. This means that, in general, the pixel throughput rate used in the higher power mode may be larger than the pixel throughput rate used in the lower power mode and equal to or less the maximum pixel throughput rate achievable by the system 200.

In some embodiments, the method 100 can include a step of setting or adjusting the second power consumption level of the higher power mode based on a position or velocity of the object 244 within the specified depth range 246. In some embodiments, the second power consumption level can be increased (e.g., by increasing the frame rate and/or the number of enabled pixels $226_E$) as the object 244 gets closer to a reference position within scene 204. In some embodiments, the reference position can correspond to the position of the depth imaging system 200. In other embodiments, the reference position can correspond to the middle or another reference position of the specified depth range 246. Thus, the signature information can be used as a control signal to gradually change the frame rate and/or the number of enabled pixels $226_E$ if the distance between the object 244 and the reference position. For example, a higher frame rate and/or a larger number of enabled pixels $226_E$ can be used when the object 244 moves toward the image sensor 210 or the middle of the specified depth range 246, and a lower frame rate and/or a smaller number of enabled pixels $226_E$ can be used when the object 244 moves away from the image sensor or the middle of the specified depth range 246.

Once the depth imaging system 200 has transitioned to the higher power mode, the depth imaging system 200 can be configured to capture higher quality image data of the object 244 within the specified depth range 246. The higher quality image data can be analyzed and processed to provide enhanced information about the object 244. In turn, the enhanced information can allow the depth imaging system 200 and/or a user to make a better informed decision as to whether to make a request or a recommendation to perform one or more actions in view of the presence of the object 244 within the specified depth range 246. For example, in the case of surveillance applications, the identification of a person within the specified depth range can trigger the activation of an alarm signal; in the case of doorbell camera applications, the identification of a known person within the specified depth range can trigger the unlocking of the door; and in the case of robotic vacuum cleaner applications, the identification of an object within the specified depth range can trigger a change in robot path and/or speed.

In some embodiments, the method 100 can include a step of determining whether an end condition to stop operating the depth imaging system 200 in the higher power mode has been reached, and a step of either returning the depth imaging system to operating in the lower power mode or continuing operating the depth imaging system in the higher power mode depending on whether the end condition has not been reached or not. Depending on the application, the term "end condition" may entail different things. In one example, determining whether the end condition has been reached can include assessing whether a specified number of images have been captured by the depth image system 200 in the higher power mode. In another example, determining whether the end condition has been reached can include assessing whether a specified time period has elapsed. In a further example, determining whether the end condition has been reached can include assessing whether the object 244 is no longer in the specified depth range 246. In yet another example, determining whether the end condition has been reached can include assessing whether a specified information about the object 244 has been determined by imaging the object 244 in the higher power mode. In some embodiments, the specified information about the object 244 can include a decision made based on the higher-quality image data as to whether to make a request or a recommendation to perform one or more actions in view of the presence of the object 244 within the specified depth range 246. Thus, it is appreciated that steps 102 and 108 of the method 100 depicted in the flow diagram of FIG. 1 may be performed in an alternate manner a number of times in operation of the depth imaging system 200.

Figure 8:
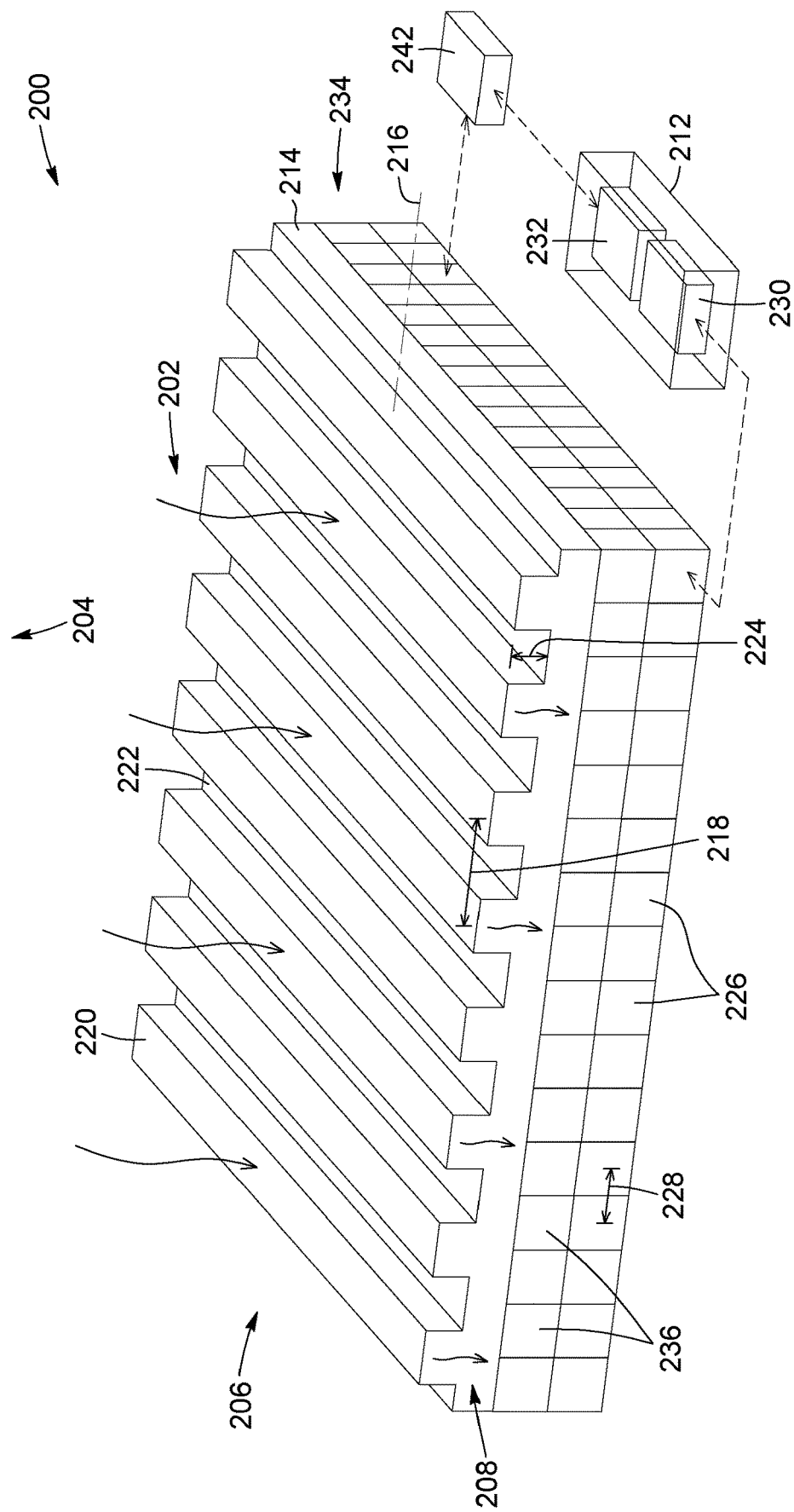
FIG. 8 is a schematic perspective view of a depth imaging system, in accordance with another embodiment.

Referring to FIG. 8, there is illustrated another embodiment of a depth imaging system 200 with which the power management techniques described herein can be used. The embodiment of FIG. 8 shares several features with the embodiment of FIG. 2, which will not be described again other than to highlight differences between them. In contrast to the embodiment of FIG. 2, which is intended for monochrome applications, the embodiment of FIG. 8 is intended for color applications. In FIG. 8, the image sensor 210 includes a color filter array 234 interposed between the TDM 206 and the array of pixels 226. The color filter array 234 includes a plurality of color filters 236 arranged in a mosaic color pattern. The color filter array 234 is configured to filter the diffracted light 208 produced by the TDM 206 spatially and spectrally according to the mosaic color pattern prior to detection of the diffracted light 208 by the array of pixels 226. In some embodiments, the color filters 236 may include red, green, and blue filters, although other filters may alternatively or additionally be used in other embodiments, such as yellow filters, cyan filters, magenta filters, clear or white filters, and IR filters. In some embodiments, the mosaic color pattern of the color filter array 234 may be an RGGB Bayer pattern, although other mosaic color patterns may be used in other embodiments, including both Bayer-type and non-Bayer-type patterns. Non-limiting examples include, to name a few, RGB-IR, RGB-W, CYGM, and CYYM patterns. In color implementations, TDM-based depth estimates may be determined on a per-color basis by parsing the pixel data according to color components, for example, based on techniques such as, or similar to, those described in co-assigned international patent applications PCT/CA2017/050686 (published as WO 2017/210781), PCT/CA2018/051554 (published as WO 2019/109182), and PCT/CA2020/050760 (published as WO 2020/243828).

In several embodiments described above, the change in power consumption level of the depth imaging system when switching between the lower power mode and the higher power mode is achieved by adjusting the pixel throughput rate of the system. However, in other embodiments, other operating parameters or conditions of the depth imaging system may be used to vary the power consumption level of the depth imaging system and define the lower power mode and the higher power mode, as will now be described with reference to the embodiment of a depth imaging system 200 depicted in FIG. 9. The embodiment of FIG. 9 shares several features with the embodiment of FIG. 2, which will not be described again other than to highlight differences between them. The depth imaging system 200 of FIG. 9 generally includes an image sensor 210 having an array of pixels 226 configured to detect light 202 incident from a scene 204; an angle-sensitive optical encoder embodied by a TDM 206 interposed between the image sensor 210 and the scene 204 and configured to modulate the incident light 202 reaching the array of pixels 226 in accordance with an angle of incidence of the incident light 202; a computer device 212 having a processor 230 and a memory 232 and configured to process the image data generated by the image sensor 210 to determine angle-dependent information about the incident light 202, from which depth information about the scene 204 may be determined; an internal battery 242 configured to supply power to other components of the depth imaging system 200; and an IR illumination source 248 configured to illuminate the scene 204 with IR illumination light 250.

The IR illumination source 248 is configured to consume less power in the lower power mode than in the higher power mode. In some embodiments, reducing the power consumed by the lower power mode can be achieved by operating the IR illumination source 248 under lower irradiance levels. In other embodiments, the IR illumination source 248 can be strobed in the lower power mode. If the IR illumination source 248 is also strobed in the higher power mode, the duty cycle of the strobing cycle can be reduced in the lower power mode. Depending on the application, the IR illumination source can be either active or inactive in the lower power mode. The IR illumination source 248 can be embodied by any appropriate device or combination of devices configured to generate the IR illumination light 250. The IR illumination source 248 can be based on different lighting technologies such as, for example, solid-state lighting including IR laser sources, such as vertical-cavity surface-emitting lasers (VCSELs), and IR light-emitting diodes (LEDs). The choice of lighting technology can be dictated by several factors including, without limitation, the wavelength, the irradiance, and the spatial and spectral illumination profiles of the IR illumination light 250. The IR illumination source 248 can include either a single optical source or a plurality of optical sources. In some embodiments, the IR illumination source 248 is configured to emit the IR illumination light 250 in a waveband including wavelengths ranging from about 0.75 μm to about 2 μm.

Figure 9:
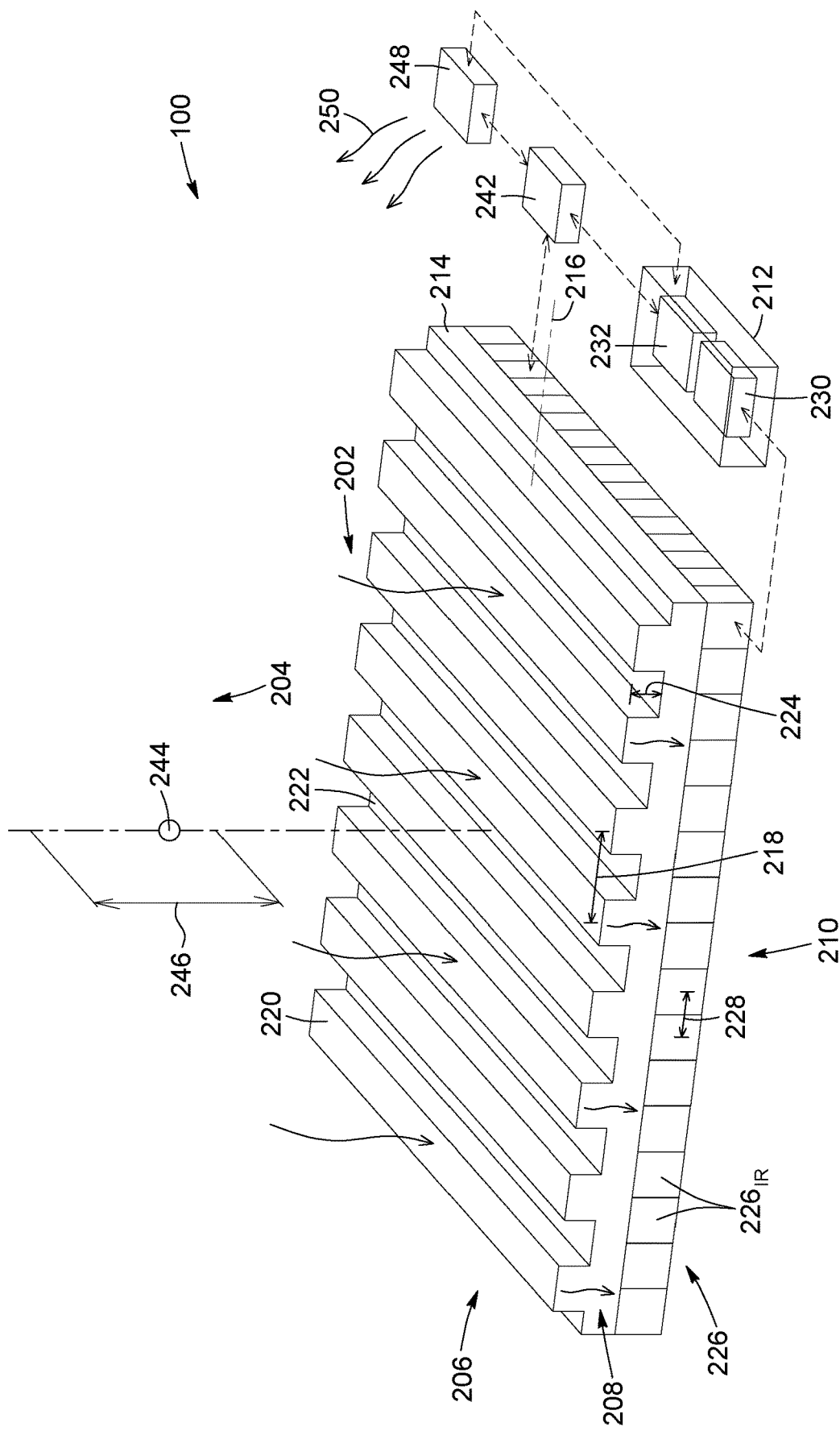
FIG. 9 is a schematic perspective view of a depth imaging system, in accordance with another embodiment.

Referring still to FIG. 9, the array of pixels includes IR-sensitive pixels $226_{IR}$ configured to capture IR image data in response to the IR illumination light 250 illuminating the scene 204. Depending on the application, all or a subset of pixels may be IR-sensitive. In some embodiments, the IR sensitivity of the IR-sensitive pixels $226_{IR}$ can be achieved through the provision of IR filters (not shown in FIG. 9), for example, the IR components of an RGB-IR filter array, but this is not a requirement. It is appreciated that the IR-sensitive pixels $226_{IR}$ may be sensitive not only to IR radiation, but also to radiation in other regions of the electromagnetic spectrum (e.g., visible light). In the illustrated embodiment, the step of identifying signature information in the captured image data indicative of a detection of an object 244 within a specified depth range 246 of the scene 204 can be performed based at least in part on the IR image data captured by the IR-sensitive pixels $226_{IR}$. Then, in response to identifying the signature information, the depth imaging system 200 can transition from operating in the lower power mode to operating in a higher power mode in which the IR illumination source 248 is configured to consume more power than in the lower power mode. In some implementations, the depth imaging system 200 of FIG. 9 can also be operated at a reduced pixel throughput rate in the lower power mode, in addition the reduced power consumption level of the IR illumination source 248.

For simplicity, several embodiments described above include TDMs provided with a single diffraction grating and, thus, a single grating orientation. However, it is appreciated that, in practice, TDMs will generally include a large number of diffraction gratings and may include multiple grating orientations. For example, in some embodiments, the TDM 206 may include a first set of diffraction gratings and a second set of diffraction gratings, where the grating axes of the diffraction gratings of the first set are orthogonal to the grating axes of the diffraction gratings of the second set. In some embodiments, the first set of diffraction gratings and the second set of diffraction gratings may be interleaved in rows and columns to define a checkerboard pattern. It is appreciated, however, that any other suitable regular or irregular arrangements of orthogonally or non-orthogonally oriented sets of diffraction gratings may be used in other embodiments. For example, in some variants, the orthogonally oriented sets of diffraction gratings may be arranged to alternate only in rows or only in columns, or be arranged randomly. Other variants may include more than two sets of diffraction gratings. Providing TDMs with multiple grating orientations can be advantageous as it can allow depth estimates to be determined for multiple feature orientations.

In addition, although several embodiments described above include TDMs provided with one-dimensional, binary phase gratings formed of alternating sets of parallel ridges and grooves defining a square-wave grating profile, other embodiments may use TDMs with other types of diffraction gratings. For example, other embodiments may use diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted light may be tailored by proper selection of the grating parameters. Furthermore, in embodiments where TDMs include multiple sets of diffraction gratings, the diffraction gratings in different sets need not be identical. In general, a TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, the grating-to-sensor distance, and the like.

Figure 10:
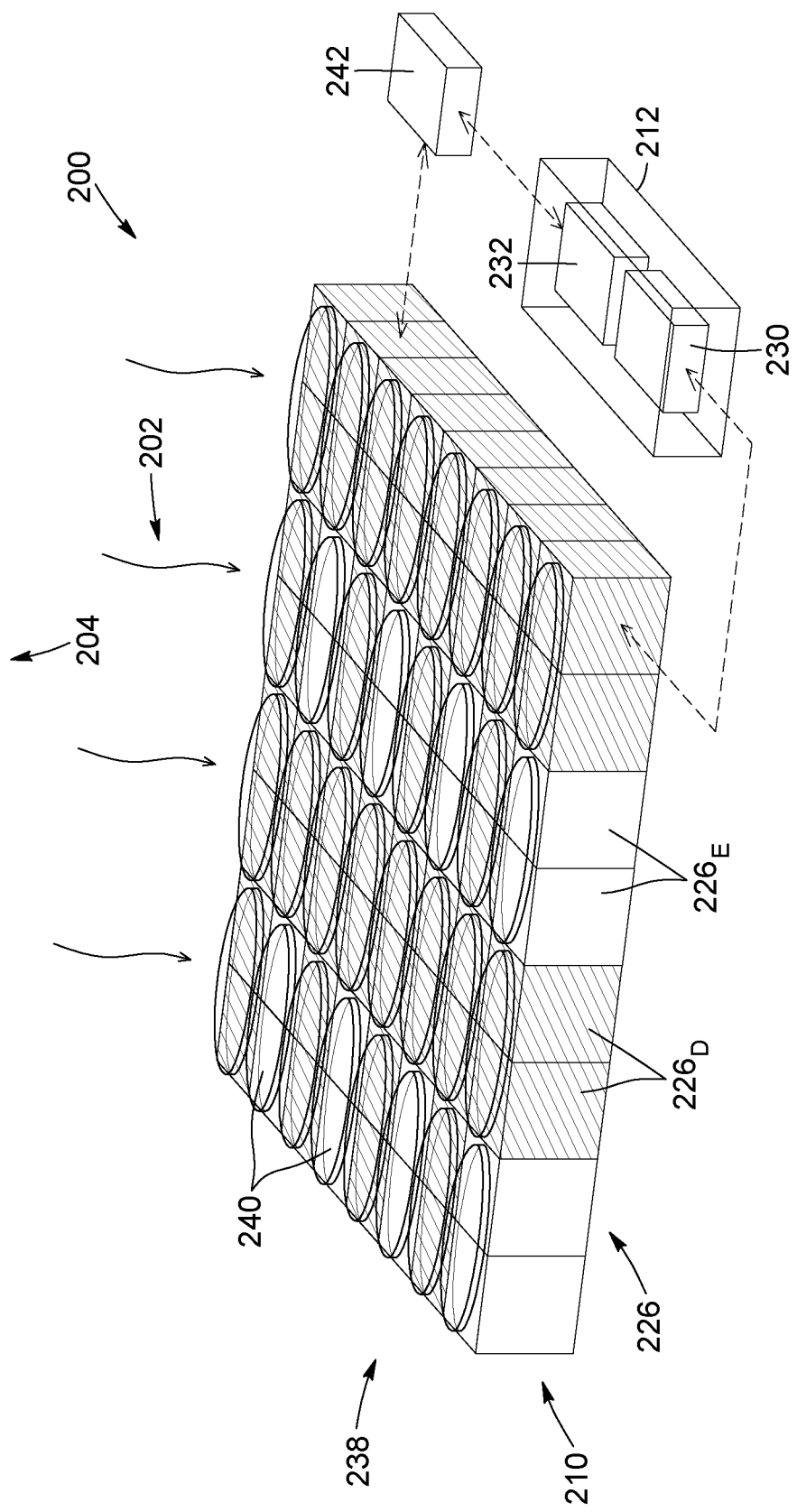
FIG. 10 is a schematic perspective view of a depth imaging system, in accordance with another embodiment.

Several embodiments described above use TDMs as optical encoders of angle-of-incidence information. However, other embodiments may use other types of passive angle-sensitive optical encoders with depth encoding capabilities. Referring to FIG. 10, there is illustrated another embodiment of a depth imaging system 200 in which the power management techniques disclosed herein may be implemented. The depth imaging system 200 is configured for capturing image data representative of light 202 received from a scene 204. The depth imaging system 200 generally includes an angle-sensitive optical encoder embodied by a microlens array 238 having a plurality of microlenses 240, an image sensor 210 having a plurality of pixels 226, and a computer device 212 including a processor 230 and a memory 232. In the illustrated embodiment, each microlens 240 of the microlens array 238 covers two pixels 226 of the image sensor 210. The microlens array 238 is configured to direct the light 202 received from the scene 204 onto the image sensor 210 for detection by the pixels 226. The computer device 212 is configured to process the image data generated by the image sensor 210 to determine angle-of-incidence information about the received light 202, from which depth information about the scene 204 may be determined. It is appreciated that FIG. 10 is a simplified schematic representation that illustrates a number of components of the depth imaging system 200, such that additional features and components that may be useful or necessary for the practical operation of the imaging system 200 may not be specifically depicted.

The provision of the microlens array 238 interposed between the image sensor 210 and the scene 204, where each microlens 240 covers two or more pixels 226 of the image sensor 210, can impart the imaging system 200 with 3D imaging capabilities, including depth sensing capabilities. This is because the different pixels in each pixel pair or group under a given microlens 240 have different angular responses, that is, they may produce different pixel responses in response to varying the angle of incidence of the received light 202, similar to the odd and even and odd pixel responses $I_+$ and $I_-$ introduced above with respect to TDM implementations. These different pixel responses may be processed to provide depth information about the scene 204. In such implementations, the pixels 226 of the image sensor 210 may be referred as phase detection pixels. It is appreciated that although the embodiment of FIG. 8 depicts a configuration where each microlens 240 covers a group of 2×1 pixels 226, other configurations are possible in other embodiments.

Figure 11:
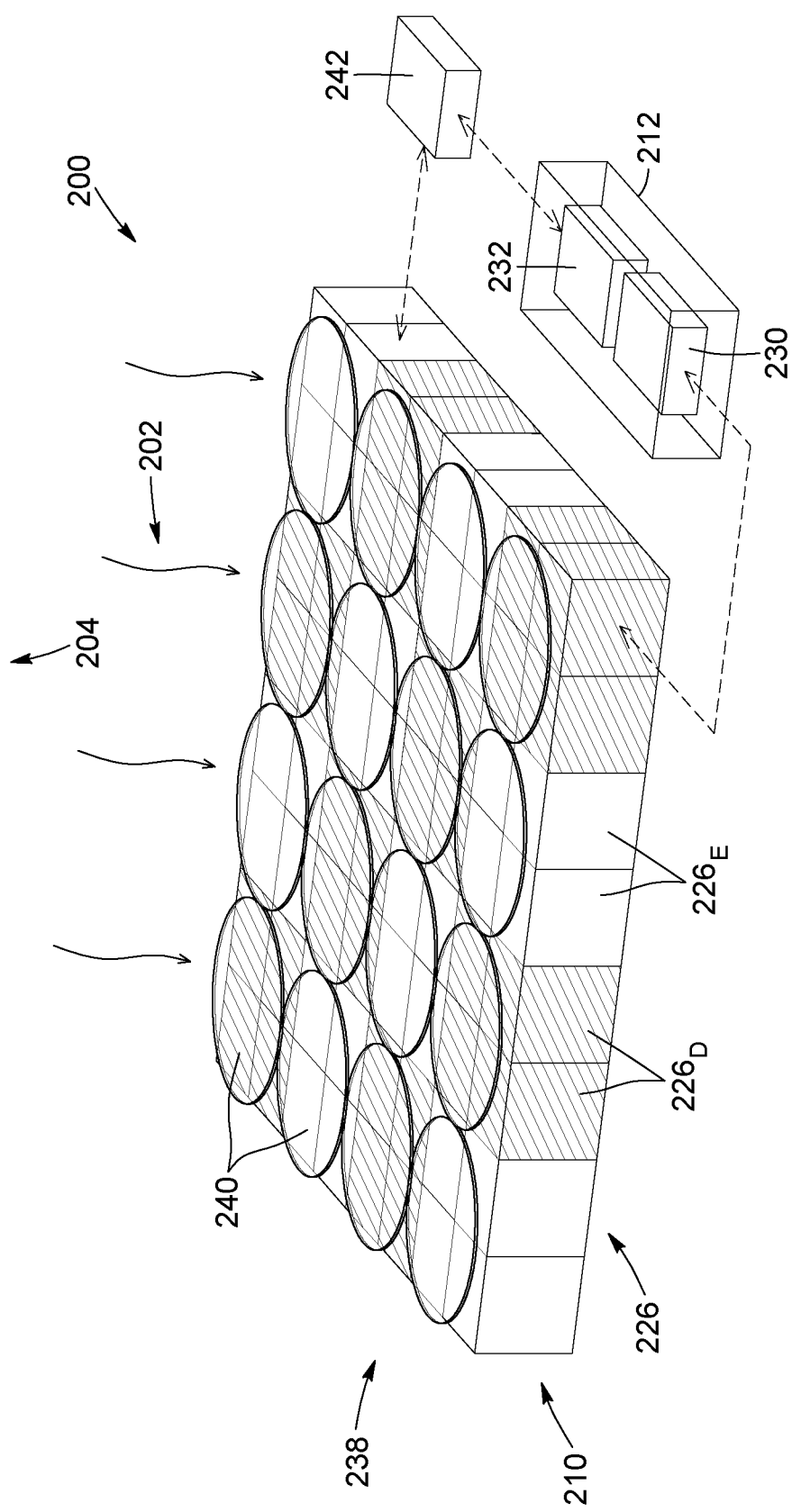
FIG. 11 is a schematic perspective view of a depth imaging system, in accordance with another embodiment.

For example, in some embodiments, each microlens 146 may cover a group of 2×2 pixels 226, as depicted in FIG. 11. Such arrangements can be referred to as quad-pixels arrangements. In other embodiments, each microlens may cover one pixel, but the pixel under the microlens may be split in two subpixels, thus providing a configuration similar to the one shown in FIG. 10. Such arrangements can be referred to as dual-pixel arrangements. It is appreciated that dual-pixel arrangements are considered herein as embodiments where each microlens effectively covers two pixels of the image sensor, as in FIG. 10. In yet other embodiments, each microlens may cover one pixel, but the pixel under the microlens may be half masked to provide angle sensitivity capabilities.

It is appreciated that the structure, configuration, and operation of imaging devices using phase detection pixels, quad-pixel technology, dual-pixel technology, half-masked pixel technologies, and other approaches using microlens arrays over pixel arrays to provide 3D imaging capabilities are generally known in the art, and need not be described in detail herein other than to facilitate an understanding of the techniques disclosed herein When operated in a lower power mode for reduced power consumption, the depth imaging system 200 of FIG. 10 includes enabled pixels $226_E$ (depicted without hatching) and disabled pixels $226_D$ (depicted with hatching), where the sub-sampling ratio defined by the ratio of the number of enabled pixels $226_E$ to the number of disabled pixels $226_D$ is equal to ¼. As noted above, various other sub-sampling ratio values can be used in other embodiments. For example, in FIG. 11, the enabled pixels $226_E$ and the disabled pixels $226_D$ are arranged so as define a set of 2×2 enabled pixel cells and a set of 2×2 disabled pixel cells, where the set of enabled pixel cells and the set of disabled pixel cells are interleaved in rows and columns to define a checkerboard pattern, so that the ratio of the number of enabled pixels $226_E$ to the number of disabled pixels $226_D$ is equal to ½. Depending on the application, the embodiments of the depth imaging system 200 of FIGS. 10 and 11 may or may not operate with a reduced frame rate in the lower power mode.

In accordance with another aspect of the present description, there is provided a non-transitory computer readable storage medium having stored thereon computer readable instructions that, when executed by a processor, cause the processor to perform a method of managing power usage of a depth imaging system. The depth imaging system can include an image sensor having an array of pixels configured to detect light incident from a scene, and an angle-sensitive optical encoder interposed between the image sensor and the scene and configured to modulate the incident light detected by the array of pixels in accordance with an angle of incidence of the incident light. The method can include controlling the depth imaging system to operate in a lower power mode corresponding to a first power consumption level of the depth imaging system and to capture, in the lower power mode and with the array of pixels, image data of the scene, the image data having angle-dependent information encoded therein by the angle-sensitive optical encoder; receiving, from the image sensor, the image data captured with the array of pixels; identifying, based on the angle-dependent information, signature information in the captured image data indicative of a detection of an object within a specified depth range of the scene; and in response to identifying the signature information, controlling the depth imaging system to transition from operating in the lower power mode to operating in a higher power mode corresponding to a second power consumption level of the depth imaging system, wherein the first power consumption level is lower than the second power consumption level.

In accordance with another aspect of the present description, there is provided a computer device including a processor and a non-transitory computer readable storage medium such as described herein and being operatively coupled to the processor. FIGS. 2 and 5 to 11 each depict an example of a computer device 212 that includes a processor 230 and a non-transitory computer readable storage medium 232 (also referred to above as a memory) operably connected to the processor 230.

Numerous modifications could be made to the embodiments described above without departing from the scope of the appended claims.

What is claimed is:

1. A method of managing power usage of a depth imaging system, the depth imaging system comprising an image sensor having an array of pixels configured to detect light incident from a scene, and an angle-sensitive optical encoder interposed between the image sensor and the scene and configured to modulate the incident light detected by the array of pixels in accordance with an angle of incidence of the incident light, the method comprising:
   operating the depth imaging system in a lower power mode corresponding to a first power consumption level of the depth imaging system, the operating comprising:
      capturing, with the array of pixels, image data of the scene, the image data having angle-dependent information encoded therein by the angle-sensitive optical encoder; and
      identifying, with a processor and based on the angle-dependent information, signature information in the captured image data indicative of a detection of an object within a specified depth range of the scene; and
   in response to identifying the signature information, transitioning the depth imaging system from operating in the lower power mode to operating in a higher power mode corresponding to a second power consumption level of the depth imaging system, wherein the first power consumption level is lower than the second power consumption level.

2. The method of claim 1, wherein:
the depth imaging system is configured to operate at a first pixel throughput rate in the lower power mode;
the depth imaging system is configured to operate at a second pixel throughput rate in the higher power mode; and
the first pixel throughput rate is lower than the second pixel throughput rate.

3. The method of claim 2, wherein:
the first pixel throughput rate corresponds to the product of a first frame rate and a first number of enabled pixels of the array of pixels for capturing the image data of the scene in the lower power mode;
the second pixel throughput rate corresponds to the product of a second frame rate and a second number of enabled pixels of the array of pixels for capturing the image data of the scene in the higher power mode; and
the first frame rate is lower than the second frame rate and/or the first number of enabled pixels is less than the second number of enabled pixels.

4. The method of claim 1, wherein:
the depth imaging system further comprises an infrared illumination source configured to illuminate the scene with infrared illumination light, wherein the infrared illumination source is configured to consume less power in the lower power mode than in the higher power mode;
the array of pixels comprises infrared-sensitive pixels configured to capture infrared image data as at least part of the image data; and
identifying the signature information in the captured image data is performed based at least in part on the infrared image data.

5. The method of claim 1, wherein the signature information consists solely of a presence of the object within the specified depth range.

6. The method of claim 1, wherein the signature information comprises a presence of the object within the specified depth range and at least one additional characteristic of the object, wherein the at least one additional characteristic of the object comprises a type of the object, a size of the object, a shape of the object, a motion of the object, a position of the object within the specified depth range, an orientation of the object, an optical property of the object, or any combination thereof.

7. The method of claim 1, further comprising:
determining whether an end condition to stop operating the depth imaging system in the higher power mode has been reached;
if the end condition has been reached, returning the depth imaging system to operating in the lower power mode; and
if the end condition has not been reached, continuing operating the depth imaging system in the higher power mode.

8. The method of claim 7, wherein determining whether the end condition has been reached comprises assessing whether a specified number of images have been captured by the depth image system in the higher power mode; or assessing whether a specified time period has elapsed; or assessing whether the object is no longer in the specified depth range; or assessing whether a specified information about the object has been determined by imaging the object in the higher power mode; or any combination thereof.

9. The method of claim 1, further comprising setting or adjusting the first power consumption level of the lower power mode based on operating conditions of the depth imaging system, wherein the operating conditions comprise a battery charge state associated with the depth imaging system; or one or more environmental conditions associated with the scene; or an intended use case associated with the operation of the depth imaging system; or any combination thereof.

10. The method of claim 1, further comprising setting or adjusting the second power consumption level of the higher power mode based on a position and/or a velocity of the object within the specified depth range.

11. The method of claim 1, wherein capturing the image data comprises capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder.

12. The method of claim 1, wherein the angle-sensitive optical encoder comprises a transmissive diffraction mask (TDM), the TDM being configured to diffract the incident light prior to the incident light reaching the array of pixels, the diffracted light having the angle-dependent information encoded therein for detection by the image sensor as the captured image data.

13. A non-transitory computer readable storage medium having stored thereon computer readable instructions that, when executed by a processor, cause the processor to perform a method of managing power usage of a depth imaging system, the depth imaging system comprising an image sensor having an array of pixels configured to detect light incident from a scene, and an angle-sensitive optical encoder interposed between the image sensor and the scene and configured to modulate the incident light detected by the array of pixels in accordance with an angle of incidence of the incident light, the method comprising:
controlling the depth imaging system to operate in a lower power mode corresponding to a first power consumption level of the depth imaging system and capture, in the lower power mode and with the array of pixels, image data of the scene, the image data having angle-dependent information encoded therein by the angle-sensitive optical encoder;
receiving, from the image sensor, the image data captured with the array of pixels;
identifying, based on the angle-dependent information, signature information in the captured image data indicative of a detection of an object within a specified depth range of the scene; and
in response to identifying the signature information, controlling the depth imaging system to transition from operating in the lower power mode to operating in a higher power mode corresponding to a second power consumption level of the depth imaging system, wherein the first power consumption level is lower than the second power consumption level.

14. The non-transitory computer readable storage medium of claim 13, wherein:
the depth imaging system is configured to operate at a first pixel throughput rate in the lower power mode;
the depth imaging system is configured to operate at a second pixel throughput rate in the higher power mode; and
the first pixel throughput rate is lower than the second pixel throughput rate.

15. The non-transitory computer readable storage medium of claim 13, wherein capturing the image data comprises capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder.

16. A depth imaging system having power usage management capabilities, the depth imaging system comprising:
an image sensor having an array of pixels configured to detect light incident from a scene;
an angle-sensitive optical encoder interposed between the image sensor and the scene and configured to modulate the incident light detected by the array of pixels in accordance with an angle of incidence of the incident light; and
a computer device comprising a processor and a non-transitory computer readable storage medium having stored thereon computer readable instructions that, when executed by the processor, cause the processor to perform operations, the operations comprising:
controlling the depth imaging system to operate in a lower power mode corresponding to a first power consumption level of the depth imaging system and capture, in the lower power mode and with the array of pixels, image data of the scene, the image data having angle-dependent information encoded therein by the angle-sensitive optical encoder;
receiving, from the image sensor, the image data captured with the array of pixels; and
identifying, based on the angle-dependent information, signature information in the captured image data indicative of a detection of an object within a specified depth range of the scene; and
in response to identifying the signature information, controlling the depth imaging system to transition from operating in the lower power mode to operating in a higher power mode corresponding to a second power consumption level of the depth imaging system, wherein the first power consumption level is lower than the second power consumption level.

17. The depth imaging system of claim 16, wherein the depth imaging system further comprises an internal battery, and wherein the image sensor and the computer device are configured to draw power from the internal battery.

18. The depth imaging system of claim 16, wherein:
the depth imaging system is configured to operate at a first pixel throughput rate in the lower power mode;
the depth imaging system is configured to operate at a second pixel throughput rate in the higher power mode; and
the first pixel throughput rate is lower than the second pixel throughput rate.

19. The depth imaging system of claim 16, wherein:
the depth imaging system further comprises an infrared illumination source configured to illuminate the scene with infrared illumination light, wherein the infrared illumination source is configured to consume less power in the lower power mode than in the higher power mode;
the array of pixels comprises infrared-sensitive pixels configured to capture infrared image data as at least part of the image data; and
identifying the signature information in the captured image data is performed based at least in part on the infrared image data.

20. The depth imaging system of claim 16, wherein capturing the image data comprises capturing the image data as a first set of pixel responses corresponding to a first set of pixels of the array of pixels and a second set of pixel responses corresponding to a second set of pixels of the array of pixels, the first set of pixel responses and the second set of pixel responses varying differently from each other with the angle of incidence of the incident light due to the modulation imparted by the angle-sensitive optical encoder.

21. The depth imaging system of claim 16, wherein the angle-sensitive optical encoder comprises a transmissive diffraction mask (TDM), the TDM being configured to diffract the incident light prior to the incident light reaching the array of pixels, the diffracted light having the angle-dependent information encoded therein for detection by the image sensor as the captured image data.

22. The depth imaging system of claim 16, wherein the angle-sensitive optical encoder comprises an array of microlenses.

\* \* \* \* \*